United States Patent
Johnston et al.

(10) Patent No.: US 10,604,041 B2
(45) Date of Patent: Mar. 31, 2020

(54) VEHICLE SEATING CUSHION WITH LINES TO INTERCONNECT WITH LINE DETENTS ON A STRUCTURAL SUPPORT

(71) Applicant: Ford Global Technologies, LLC, Dearborn, MI (US)

(72) Inventors: Corbin Shea Johnston, Winnipeg (CA); Spencer Robert Hoernke, Dundas (CA); Johnathan Andrew Line, Northville, MI (US); Kevin Mozurkewich, Livonia, MI (US); Andrew Matusko, Dexter, MI (US); Brian Thiel, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 460 days.

(21) Appl. No.: 15/583,388

(22) Filed: May 1, 2017

(65) Prior Publication Data
US 2018/0312088 A1 Nov. 1, 2018

(51) Int. Cl.
*B60N 2/68* (2006.01)
*B60N 2/70* (2006.01)
*A47C 7/02* (2006.01)

(52) U.S. Cl.
CPC ............... *B60N 2/68* (2013.01); *B60N 2/682* (2013.01); *B60N 2/70* (2013.01); *A47C 7/021* (2013.01)

(58) Field of Classification Search
CPC .......... A47C 7/02; A47C 7/021; A47C 7/029; A47C 7/425; B60N 2/64; B60N 2/646; B60N 2/68; B60N 2/682; B60N 2/686; B60N 2/70; B60N 2/7094; B60N 2/72

USPC ........ 5/655.9, 653, 652; 297/452.18, 425.26, 297/452.48, 452.52, 452.53, 440.22
See application file for complete search history.

(56) References Cited

U.S. PATENT DOCUMENTS

| | | | | |
|---|---|---|---|---|
| 3,537,752 A * | 11/1970 | Kushnarov | ............ | A47C 7/282 297/452.52 |
| 3,630,572 A * | 12/1971 | Homier | .................... | A47C 7/18 297/452.6 |
| 4,332,419 A | 6/1982 | Vogel | | |
| 4,337,931 A * | 7/1982 | Mundell | ................. | A47C 7/287 267/102 |
| 4,396,226 A * | 8/1983 | Haack | .................. | A47C 31/023 297/452.57 |
| 4,452,488 A * | 6/1984 | Rugienius | ............ | B60N 2/5825 297/452.6 |
| 4,831,697 A | 5/1989 | Urai | | |
| 7,926,872 B2 * | 4/2011 | Chida | .................. | B60N 2/4228 297/216.13 |

(Continued)

*Primary Examiner* — Robert G Santos
(74) *Attorney, Agent, or Firm* — David Coppiellie; Price Heneveld LLP

(57) ABSTRACT

A seating assembly for a vehicle comprising: a cushion comprising an outer edge and a plurality of lines; a carrier comprising a perimeter outer surface and a plurality of line detents near the perimeter outer surface of the carrier retaining the plurality of lines such that the cushion is interconnected with the carrier; wherein the plurality of lines and plurality of line detents are arranged to prevent the edge of the cushion from rolling up. The cushion can further comprise a rearward extending lip having an inwardly facing surface; wherein the cushion at least partially surrounds the carrier with at least a portion of the inwardly facing surface of the lip facing the perimeter outer surface of the carrier.

20 Claims, 21 Drawing Sheets

(56) References Cited

U.S. PATENT DOCUMENTS

| | | | |
|---|---|---|---|
| 7,946,649 B2 | 5/2011 | Galbreath et al. | |
| 8,398,174 B2 * | 3/2013 | Hofmann | B60N 2/5825 |
| | | | 297/218.1 |
| 8,696,061 B2 * | 4/2014 | Kasama | B60N 2/64 |
| | | | 297/216.13 |
| 10,473,136 B2 * | 11/2019 | Line | F16B 2/22 |
| 2009/0108646 A1 * | 4/2009 | Chida | B60N 2/4228 |
| | | | 297/216.13 |
| 2011/0080032 A1 * | 4/2011 | Hofmann | B60N 2/5825 |
| | | | 297/463.1 |
| 2012/0286555 A1 * | 11/2012 | Kasama | B60N 2/64 |
| | | | 297/452.18 |
| 2018/0312088 A1 * | 11/2018 | Johnston | B60N 2/68 |
| 2018/0340563 A1 * | 11/2018 | Line | B60N 2/682 |
| 2020/0018341 A1 * | 1/2020 | Line | B60N 2/64 |

\* cited by examiner

VEHICLE SEATING CUSHION WITH LINES TO INTERCONNECT WITH LINE DETENTS ON A STRUCTURAL SUPPORT

FIELD OF THE INVENTION

The present invention generally relates to the attachment of cushions onto a structural support for use as part of a vehicle seating assembly.

BACKGROUND OF THE INVENTION

A novel vehicle seating assembly utilizing a seatback including a carrier and a cushion assembly attached to the carrier was disclosed in U.S. patent application Ser. No. 15/414,659, filed on Jan. 25, 2017, the entire disclosure of which is hereby incorporated by reference. The carrier provides structural support for the cushion assembly.

SUMMARY OF THE INVENTION

According to a first aspect of the present invention, a cushion for a seating assembly of a vehicle comprises: an outer edge; and a plurality of lines arranged to interconnect with a plurality of detents on a structural support, so as to prevent the outer edge from rolling up.

Embodiments of the first aspect of the invention can include any one or a combination of the following features:
  a forward facing surface and a carrier facing surface opposite the forward facing surface, wherein the plurality of lines are accessible for interconnection from the carrier facing surface;
  each of the plurality of lines comprising a parallel portion that is parallel to the outer edge;
  a rearward extending lip along the outer edge configured to at least partially surround the structural support, wherein the plurality of lines are adjacent to the lip;
  the lip further comprising an inwardly facing surface, wherein at least a portion of the plurality of lines extend generally inward from the inwardly facing surface;
  the lip further comprising an inward edge adjacent the inwardly facing surface, wherein at least a portion of the plurality of lines project from the inward facing surface at an angle away from the inward edge; and
  a foam portion, and a contiguous wire molded into the foam portion, wherein the contiguous wire comprises an exposed portion forming at least one of the plurality of lines and embedded portions embedded into the foam portion before and after the line.

According to a second aspect of the present invention, a carrier for a seating assembly of a vehicle comprises: a perimeter outer surface; and a plurality of line detents near the perimeter outer surface arranged to receive and retain a plurality of lines positioned on a cushion and thereby interconnect the carrier and the cushion.

Embodiments of the second aspect of the invention can include any one or a combination of the following features:
  at least one line detent of the plurality of line detents comprises a rearward extending tab that comprises an outer surface and an inside surface and a tooth extending inward from the inside surface;
  the outer surface of the tab is the perimeter outer surface;
  the tooth comprising a slide surface and a retaining surface, wherein the slide surface and the retaining surface coincide at an apex, and wherein the slide surface and the inside surface of the tab form an obtuse angle toward the apex;
  a rearward extending peripheral lip, the outer surface of which is the perimeter outer surface, wherein the tab is contiguous with the peripheral lip, and wherein the peripheral lip includes a first recess adjacent the tab and a second recess adjacent the tab on the opposite side of the tab as the first recess;
  at least one line detent of the plurality of line detents comprises a tab extending away from the perimeter outer surface and then generally rearward forming a line retention channel; and
  the tab comprises an opposing section that faces the perimeter outer surface, and a tooth extending toward the perimeter outer surface, wherein the tooth and the perimeter outer surface define an opening into the line retention channel, wherein the distance between the opposing section and the perimeter outer surface defines a width of the line retention channel and the opening has a width, and wherein the width of the opening is narrower than the width of the line retention channel.

According to a third aspect of the present invention, a seating assembly for a vehicle comprises: a cushion comprising an outer edge and a plurality of lines; a carrier comprising a perimeter outer surface and a plurality of line detents near the perimeter outer surface of the carrier arranged to receive and retain the plurality of lines; and the plurality of line detents having received and is retaining the plurality of lines such that the cushion is interconnected with the carrier; wherein the plurality of lines and plurality of line detents are arranged to prevent the edge of the cushion from rolling up.

Embodiments of the third aspect of the invention can include any one or a combination of the following features:
  the cushion further comprising a rearward extending lip having an inwardly facing surface, wherein the cushion at least partially surrounds the carrier with at least a portion of the inwardly facing surface of the lip facing the perimeter outer surface of the carrier;
  at least a portion of the plurality of lines comprise a parallel portion that is parallel to the outer edge, and at least a portion of the plurality of line detents comprise a rearward extending tab that comprises an outer surface, an inside surface and a tooth extending inward from the inside surface, wherein the at least a portion of the plurality of lines is adjacent the inside surface and the tooth;
  the at least a portion of the plurality of lines extend generally inward from the inwardly facing surface, and the outer surface of the tab is the perimeter outer surface;
  at least one line detent of the plurality of line detents comprises a tab extending away from the perimeter outer surface and then generally rearward forming a line retention channel, and at least one line of the plurality of lines is within the line retention channel; and
  the cushion further comprising a foam portion and one or more contiguous wires molded into the foam portion, wherein the one or more contiguous wires each comprise at least one exposed portion forming at least one of the plurality of lines and embedded portions embedded into the foam portion before and after the exposed portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
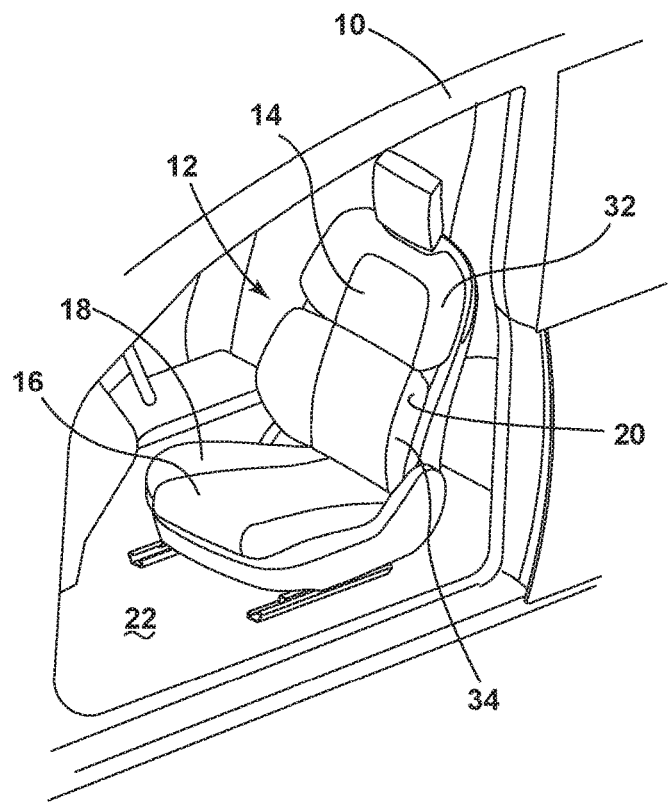
FIG. 1 is a perspective view of an interior of a vehicle illustrating a seating assembly.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
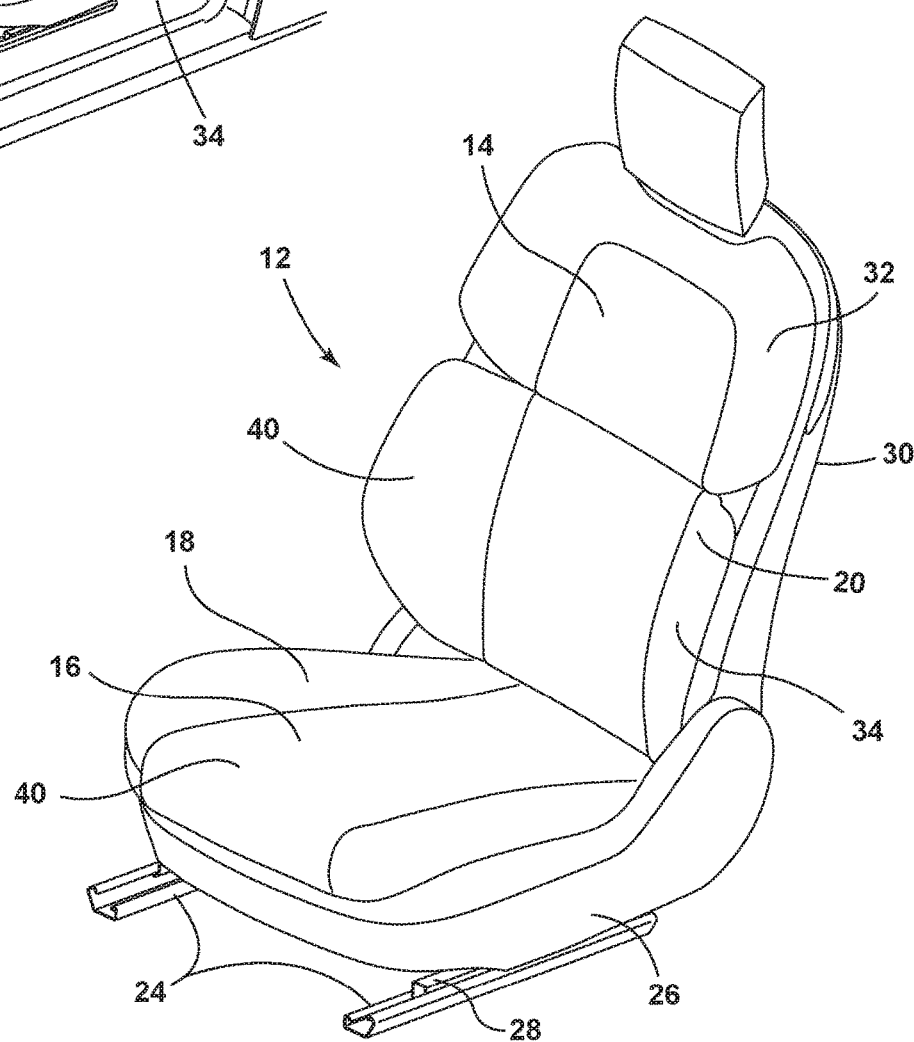
FIG. 2 is a perspective view of the seating assembly of FIG. 1, illustrating the seatback comfort assembly as part of the seatback.

Referring now to FIGS. 1 and 2, the interior of a vehicle 10 is illustrated. The vehicle 10 can be an automobile, such as a car, a truck, or a van. The vehicle 10 includes a seating assembly 12. The seating assembly 12 generally includes a seatback 14 and a seat 16. The seatback 14 is generally adjustable relative to the seat 16, and the position of the entire seating assembly 12 is adjustable. The seatback 14 is the portion of the seating assembly 12 configured to support the back of an occupant of the seating assembly 12. The seat 16 is the portion of the seating assembly 12 upon which the occupant sits. The seating assembly 12 includes a seat comfort assembly 18 and a seatback comfort assembly 20, which assemblies provide cushioning to the occupant of the seating assembly 12. Both the seat comfort assembly 18 and the seatback comfort assembly 20 are a comfort assembly for the seating assembly 12.

The seating assembly 12 attaches to the floor 22 of the vehicle 10 via rail system 24. More specifically, the seat 16 portion of the seating assembly 12 includes a seat frame 26, which supports the seat comfort assembly 18 and is attached to a slide 28. The slide 28 slides within the rail system 24 to adjust the position of the seating assembly 12. The seatback 14 of the seating assembly 12 further includes a back panel 30. The seatback comfort assembly 20 includes an upper thoracic region 32 and a lower lumbar region 34.

Figure 3:
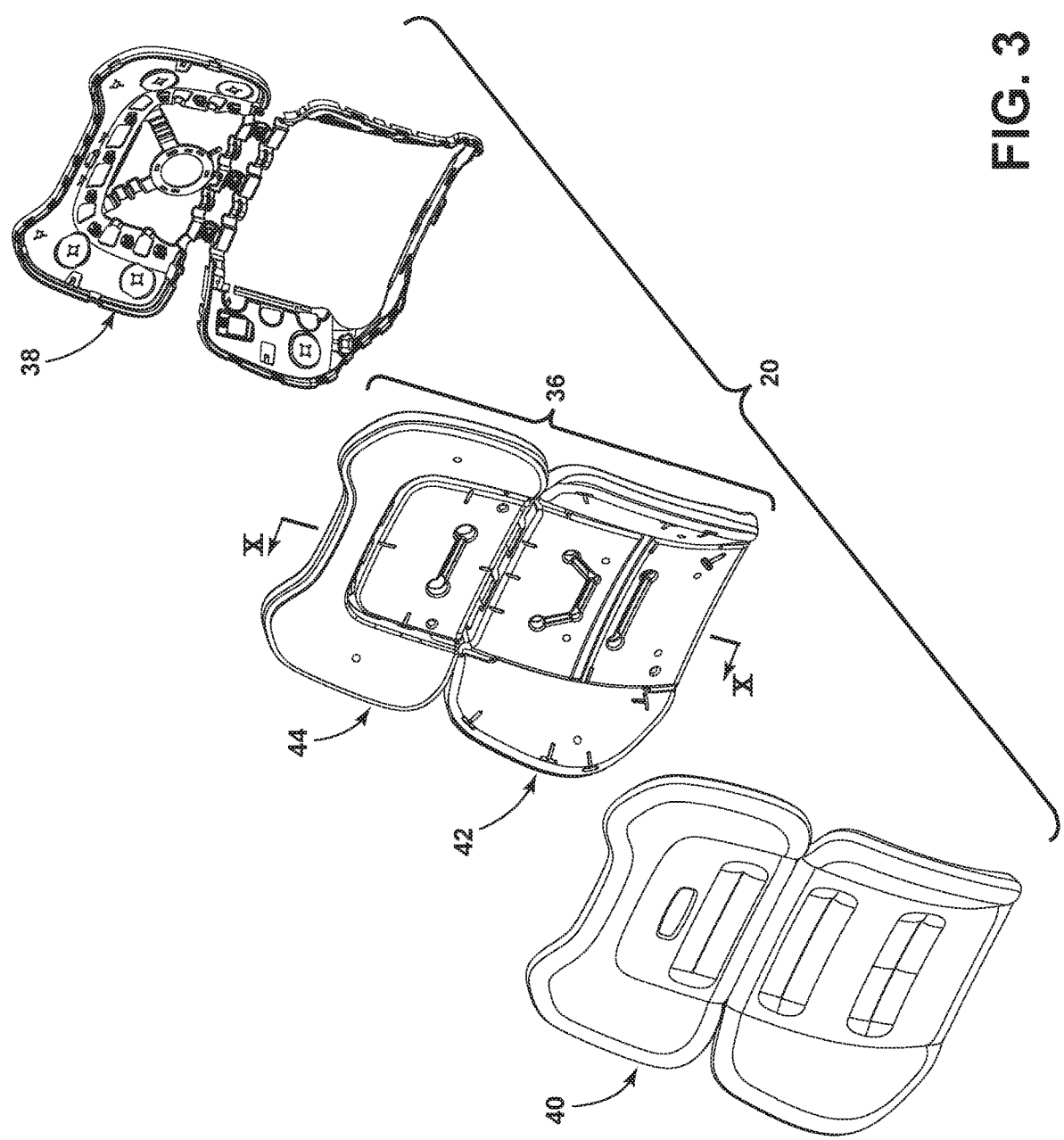
FIG. 3 is an exploded perspective view of the seatback comfort assembly of FIG. 2, illustrating a cushion assembly with a lower lumbar component attached to a carrier.
Figure 4:
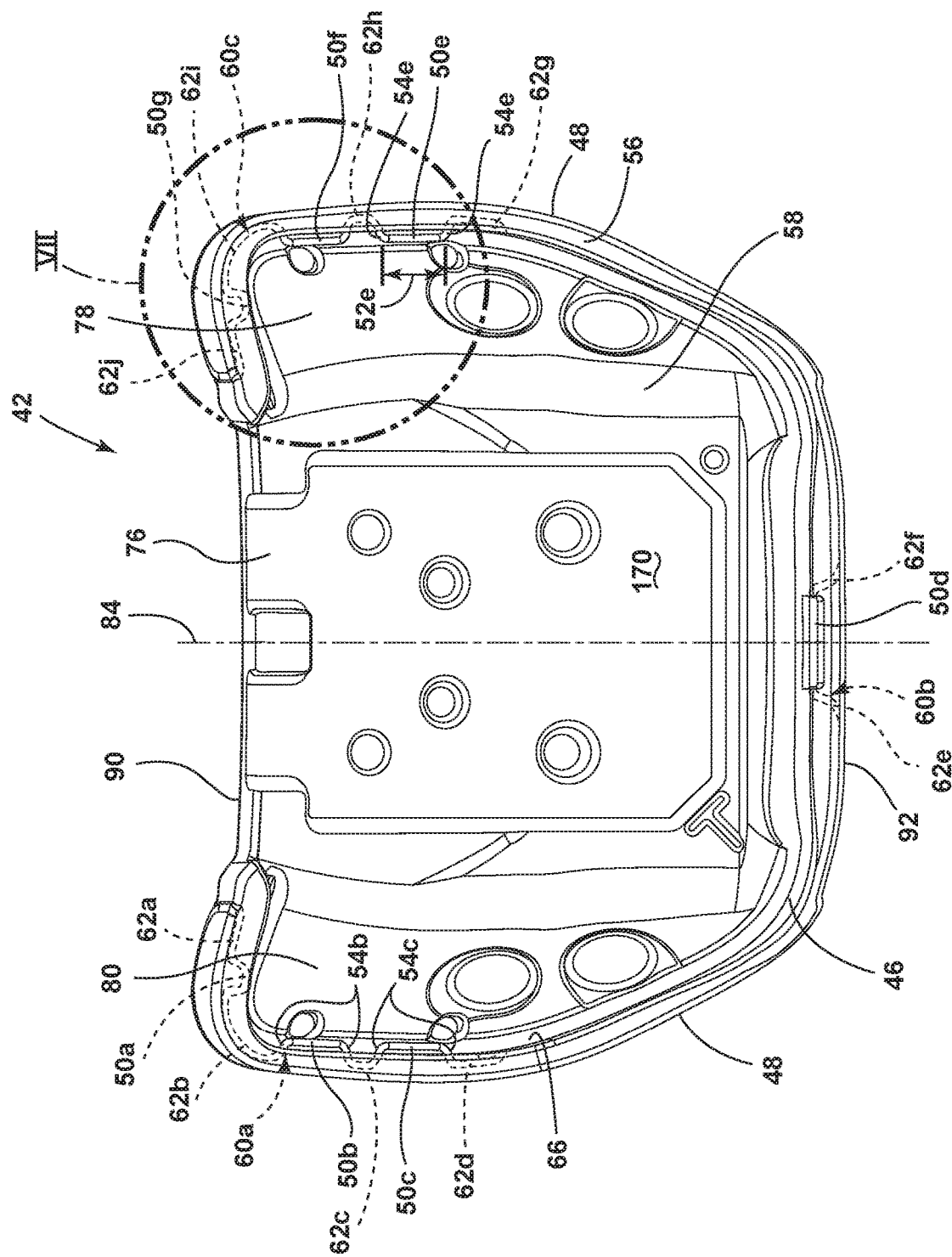
FIG. 4 is a rear view of the lower lumbar component of FIG. 3, illustrating a plurality of lines disposed about a periphery near of an outer edge.
Figure 5:
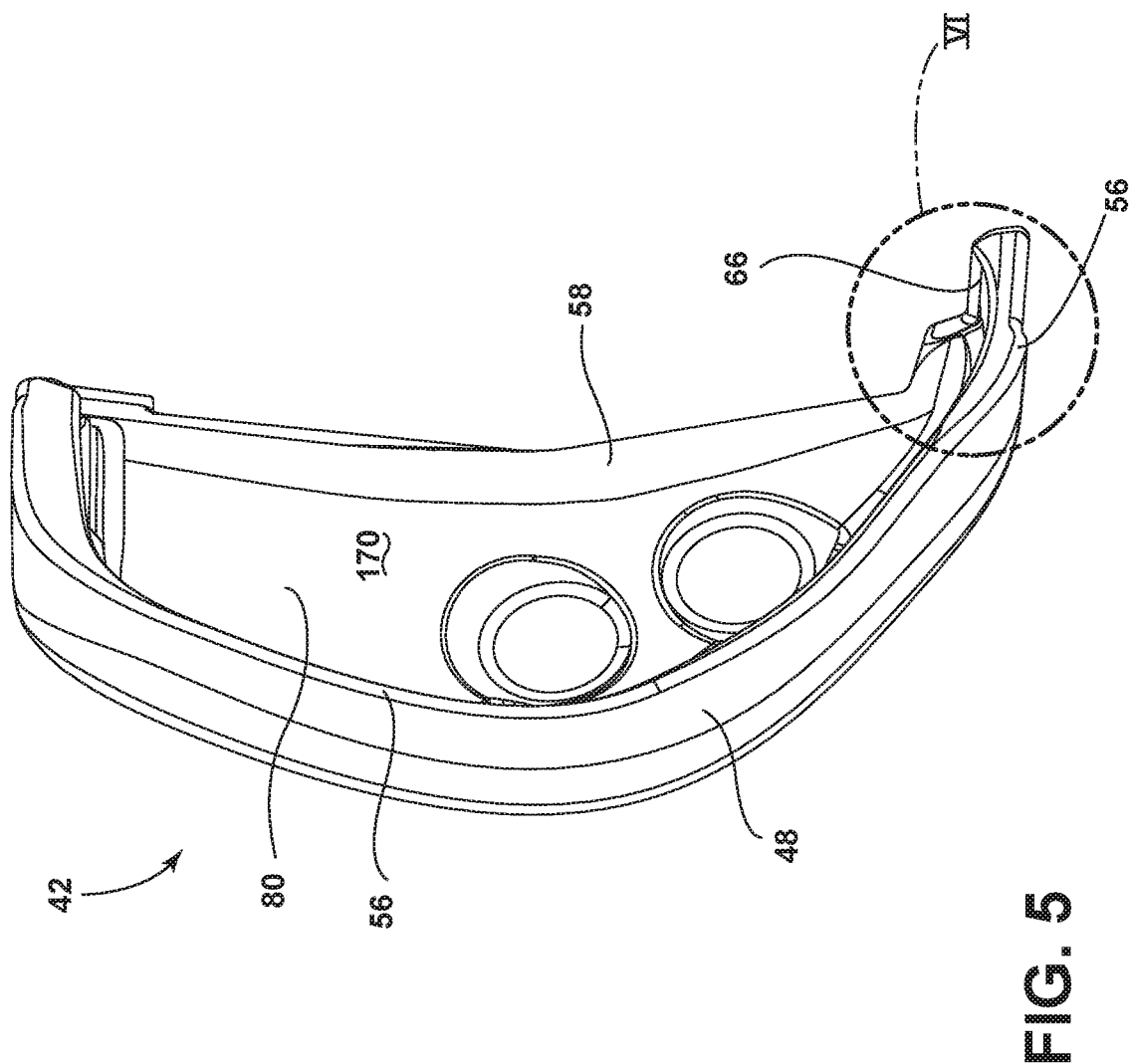
FIG. 5 is a side view of the lower lumbar component of FIG. 3, illustrating a lip extending rearward to partially surround a lower lumbar section of the carrier when attached.
Figure 6:
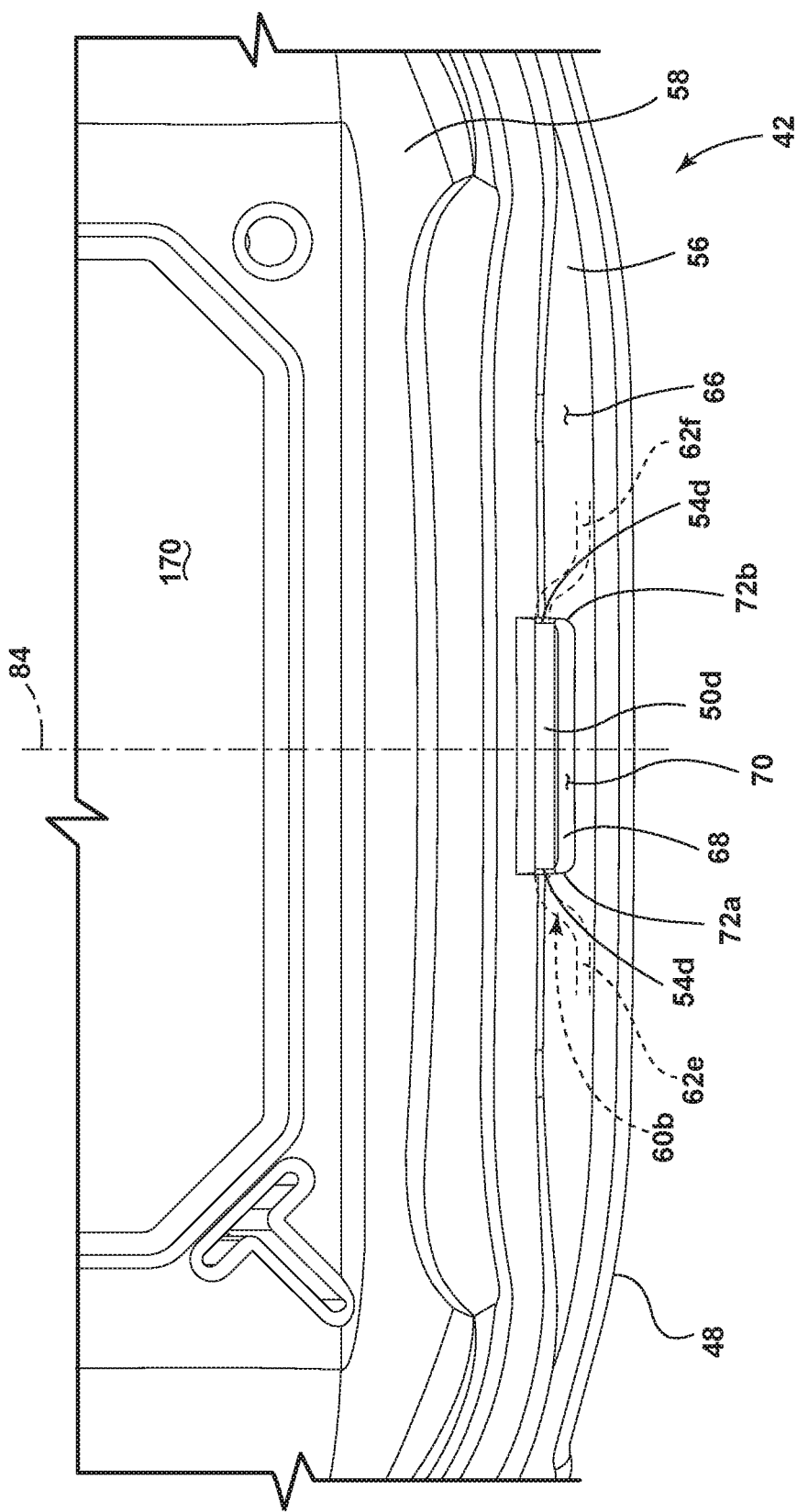
FIG. 6 is a rear close-up view of the lower lumbar component of FIG. 3 taken at VI of FIG. 5, illustrating one of the plurality of lines partially enclosed within a recessed portion of the lip.

Referring now to FIG. 3, the seatback comfort assembly 20 for the seating assembly 12 is illustrated in an exploded view. A cushion assembly 36 is attached to a carrier 38. A coverstock 40 is attached to the carrier 38, covering the cushion assembly 36. The carrier 38 is attached to other elements of the seatback 14 and provides structural support for the cushion assembly 36 and the coverstock 40. The cushion assembly 36 cushions the body of the occupant of the seating assembly 12. The cushion assembly 36 includes a lower lumbar component 42 which corresponds to the lower lumbar region 34 of the seatback comfort assembly 20, and an upper thoracic component 44 which corresponds to the upper thoracic region 32 of the seatback comfort assembly 20. In other words, the lower lumbar component 42 is disposed in the lower lumbar region 34 of the seatback comfort assembly 20 and the upper thoracic component 44 is disposed in the upper thoracic region 32 of the seatback comfort assembly 20. Alternatively, the cushion assembly 36 for the seatback comfort assembly 20 can be one contiguous component instead of separate components 42, 44. The coverstock 40 is a fabric such as cloth, vinyl, or leather. The carrier 38 is molded plastic. While not illustrated, it should be understood that the seat comfort assembly 18 likewise includes a cushion assembly attached to a structural support (a carrier) and a coverstock covering the cushion assembly.

Referring now to FIGS. 4-10, the lower lumbar component 42 of the cushion assembly 36 includes a periphery 46. The periphery 46 is the area of the lower lumbar component 42 near to and including an outer edge 48. The lower lumbar component 42 includes a carrier facing surface 170 and a forward facing surface 86 (see FIG. 8) opposite the carrier facing surface 170. The forward facing surface 86 is the main surface contacting the coverstock 40 and facing an occupant of the seating assembly 12. The carrier facing surface 170 is the side of the lower lumbar component 42 that generally faces and abuts the carrier 38, when the lower lumbar component 42 is attached to the carrier 38.

The lower lumbar component 42 includes a plurality of lines 50a-g disposed about the periphery 46 near the outer edge 48 including a first line 50a, a second line 50b, a third line 50c, a fourth line 50d, a fifth line 50e, a sixth line 50f, and seventh line 50g. Each of the plurality of lines 50a-g are arranged to interconnect with one of a plurality of line detents (discussed below) present on the carrier 38 thus interconnecting the lower lumbar component 42 to the carrier 38. The plurality of lines 50a-g are arranged so as to prevent the outer edge 48 from rolling up after the lower lumbar component 42 cushion is attached to the carrier 38. To prevent the outer edge 48 from rolling up, the plurality of lines 50a-g are provided close to the outer edge 48 and numerous lines 50a-g are utilized. In this embodiment of the lower lumbar component 42 of the cushion assembly 36, seven spaced apart lines 50a-g are utilized. One line, line 50d, is located at a midline 84 of the lower lumbar component 42. Three lines, lines 50a-c, are located to one side of the midline 84. Three lines, lines 50e-g, are located to the other side of the midline 84. The plurality of lines 50a-g are accessible for interconnection from the carrier facing surface 170. In other words, the plurality of lines 50a-g are accessible from the rear of the lower lumbar component 42. Thus, the plurality of lines 50a-g allow the carrier facing surface 170 to face and abut the carrier 38.

The lower lumbar component 42 has a foam portion 58. Three contiguous wires 60a-c partially molded into the foam portion 58 form the plurality of lines 50a-g. More specifically, a first contiguous wire 60a forms lines 50a-c, a second contiguous wire 60b forms line 50d, and a third contiguous wire 60c forms lines 50e-g. Each of the three contiguous wires 60a-c are a preformed wire segments. Magnets hold the wire segment in place within a mold. Foam is then molded within the mold, molding over the wire segments, resulting in foam portion 58 and the three contiguous wires 60a-c forming the plurality of lines 50a-g. Each of the three contiguous wires 60a-c includes a portion embedded in the foam portion 58 before and after an exposed portion of the contiguous wire forming one of the plurality of lines 50a-g. For example, contiguous wire 60a includes embedded portions 62a and 62b before and after line 50a, embedded portions 62b and 62c before and after line 50b, and embedded portions 62c and 62d before and after line 50c. In addition, contiguous wire 60b includes embedded portions 62e and 62f before and after line 50d. Finally, contiguous wire 60c includes embedded portions 62g and 62h before and after line 50e, embedded portions 62h and 62i before and after line 50f, and embedded portions 62i and 62j before and after line 50g. Each of the plurality of lines 50a-g is thus wire or foam covered wire, but could be any rope, wire, or cord-like length of material extending from a surface of the lower lumbar component 42 and connecting to the foam portion 58 at two spaced apart points.

The lower lumbar component 42 further includes a lip 56 disposed about the periphery 46 along the outer edge 48. The lip 56 extends generally rearward. The lip 56 has an inwardly facing surface 66. The plurality of lines 50a-g are adjacent the lip 56 and lines 50a-c, e-g extend generally inward from the inwardly facing surface 66 of the lip 56.

Figure 7B:
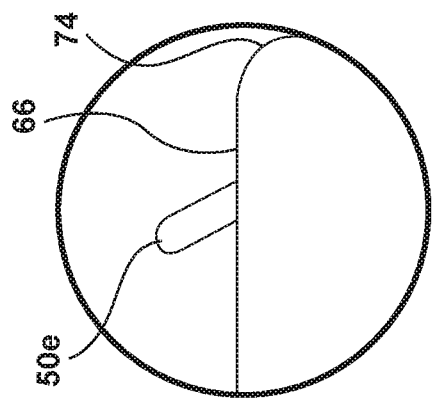
FIG. 7B is a close-up side view of one of the lines of FIG. 7A, illustrating the line projecting from the an inward facing surface of the lip at an angle away from an inward edge.
Figure 7A:
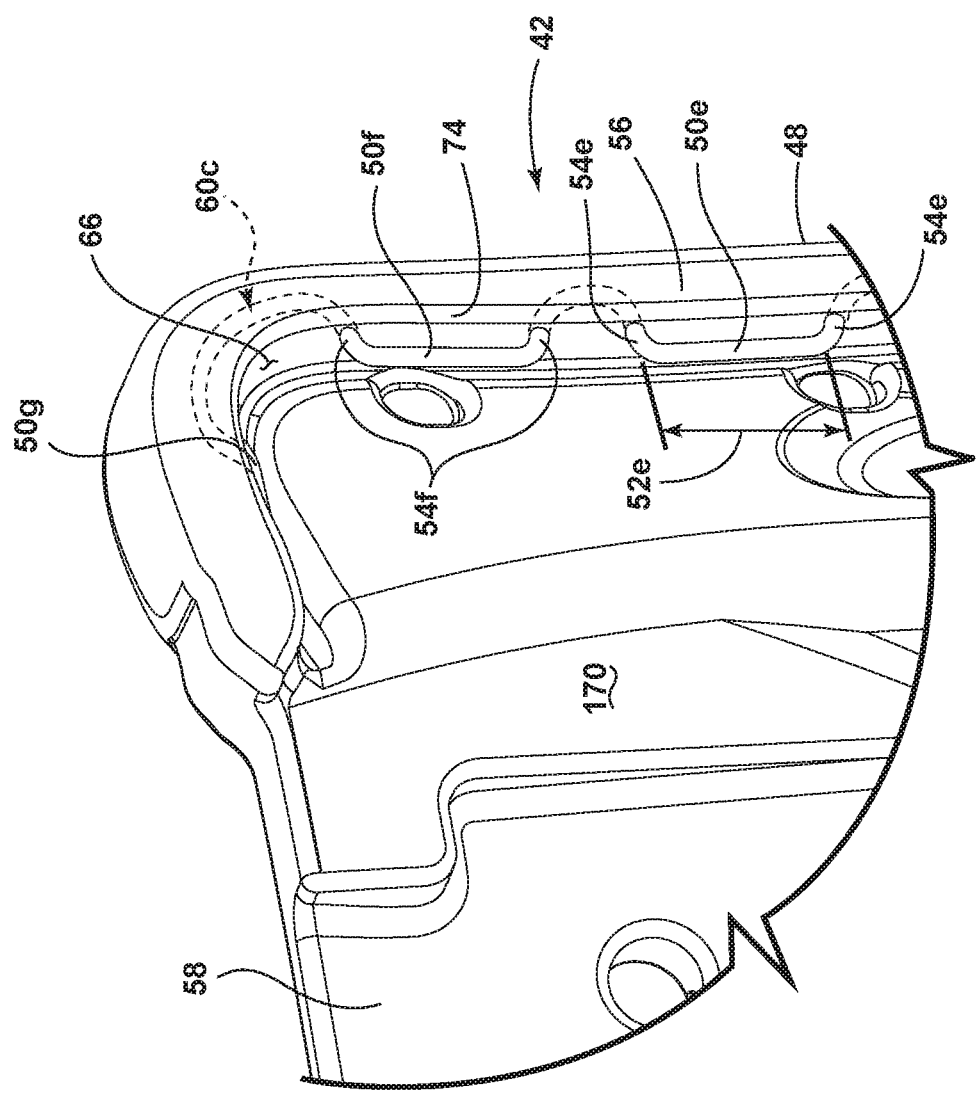
FIG. 7A is a rear perspective close-up view of the lower lumbar component of FIG. 3 taken at VII of FIG. 4, illustrating several lines extending from the lip parallel to the outer edge.

Each of the plurality of lines 50a-g share commonalities, which can be detailed through a discussion of representative line 50e (see FIG. 7A). Line 50e includes a parallel portion 52e that is generally parallel to the outer edge 48 of the lower lumbar component 42 to which the parallel portion 52e is closest. In addition, line 50e extends from the foam portion 58 of the lower lumbar component 42 at a pair of connecting points 54e.

Each of the lines 50a-c, e-g share further commonalities, which can again be detailed through a discussion of representative line 50e. The parallel portion 52e is also generally parallel to the portion of the inwardly facing surface 66 from which the line 50e projects. In addition, the pair of connecting points 54e are disposed on the inwardly facing surface 66. Thus, line 50e projects away from the inwardly facing surface 66 of the lip 56. More specifically, the lip 56 further includes an inward edge 74 adjacent the inwardly facing surface 66, and line 50e projects from the inward facing surface 66 of the lip 56 at an angle away from the inward edge 74 of the lip 56 (see FIG. 7B).

The lip 56 further includes a recessed portion 68 (see FIG. 6) recessed into the inwardly facing surface 66 of the lip 56 at the midline 84. Line 50d is disposed within the recessed portion 68. Line 50d is disposed generally parallel the inwardly facing surface 66 of the lip 56. The pair of connecting points 54d for the line 50d are entirely within the recessed portion 68. More specifically, the recessed portion 68 includes an elongated surface 70 disposed between two sides walls 72a, 72b, and the line 50d is connected to side walls 72a,b at the connecting points 54d. The line 50d is parallel to the elongated surface 70.

As discussed further below, the lip 56 at least partially surrounds the carrier 38 when the lower lumbar component 42 is interconnected with the carrier 38. Because the lip 56 at least partially surrounds the carrier 38, the plurality of lines 50a-g are positioned adjacent (close to) or on the lip 56 as close to the outer edge 48 as possible, which assists in preventing the outer edge 48 from rolling up.

The lower lumbar component 42 includes a middle portion 76, a first laterally and forwardly winged portion 78 to one side of the middle portion 76, and a second laterally and forwardly winged portion 80 to the other side of the middle portion 76 and opposite the first laterally and forwardly winged portion 78. A vertically extending recess 82a (see FIG. 8) marks a transition between the middle portion 76 and the first laterally and forwardly winged portion 78. Likewise, a vertically extending recess 82b marks a transition between the middle portion 76 and the second laterally and forwardly winged portion 80.

The middle portion 76 is centered about the midline 84. The first laterally and forwardly winged portion 78 and the second laterally and forwardly winged portion 80 extend laterally (away from the midline 84) and forwardly relative to the middle portion 76. Each of the middle portion 76, the first laterally and forwardly winged portion 78, and the second laterally and forwardly winged portion 80 include at least one of the plurality of lines 50a-g. More specifically, lines 50a-c are located at the second laterally and forwardly winged portion 80, line 50d is located at the middle portion 76, and lines 50e-g are located at the first laterally and forwardly winged portion 78. The lip 56 is part of the first laterally and forwardly winged portion 78, the second laterally and forwardly winged portion 80, and the middle portion 76.

The forward facing surface 86 defines at least one concave line of curvature 88a (see FIG. 9) between the midline 84 and the first laterally and forwardly winged portion 78. "Concave line of curvature" means that the surface between two points marking endpoints of a line on the surface is concave. Similarly, the forward facing surface 86 defines at least one concave line of curvature 88b between the midline 84 and the second laterally and forwardly winged portion 80. In other words, the forward facing surface 86 of the middle portion 76 is generally concave horizontally.

The middle portion 76 of the lower lumbar component 42 further includes a top 90 and a bottom 92. The forward facing surface 86 at the middle portion 76 defines at least one convex line of curvature 94 (see FIG. 10) between the top 90 and the bottom 92. "Convex line of curvature" means that the surface between two points marking endpoints of a line on the surface is convex. In other words, the forward facing surface 86 of the middle portion 76 is generally convex vertically.

Figure 8:
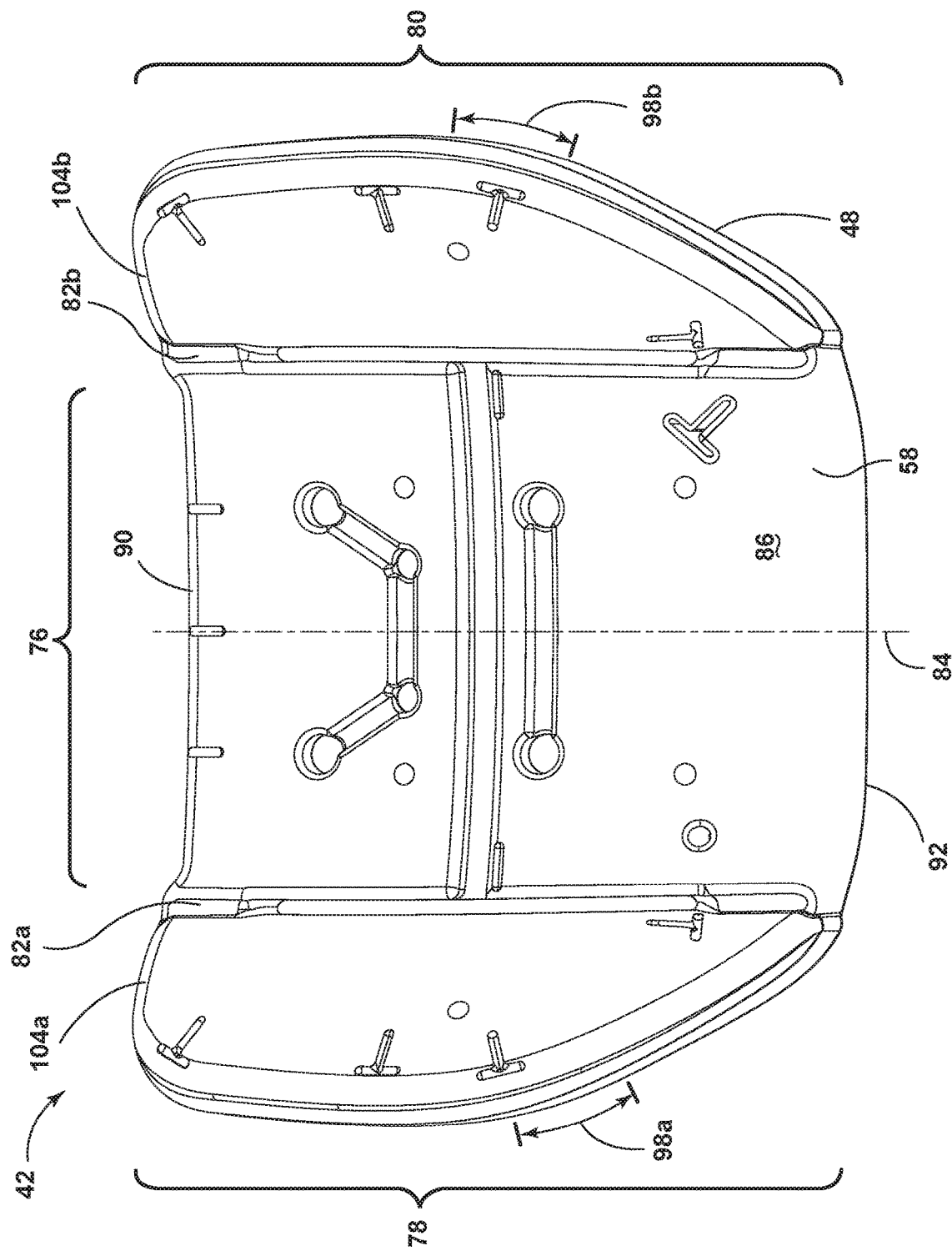
FIG. 8 is a front view of the lower lumbar component of FIG. 3, illustrating a middle portion between laterally and forwardly extending winged sections.
Figure 9:
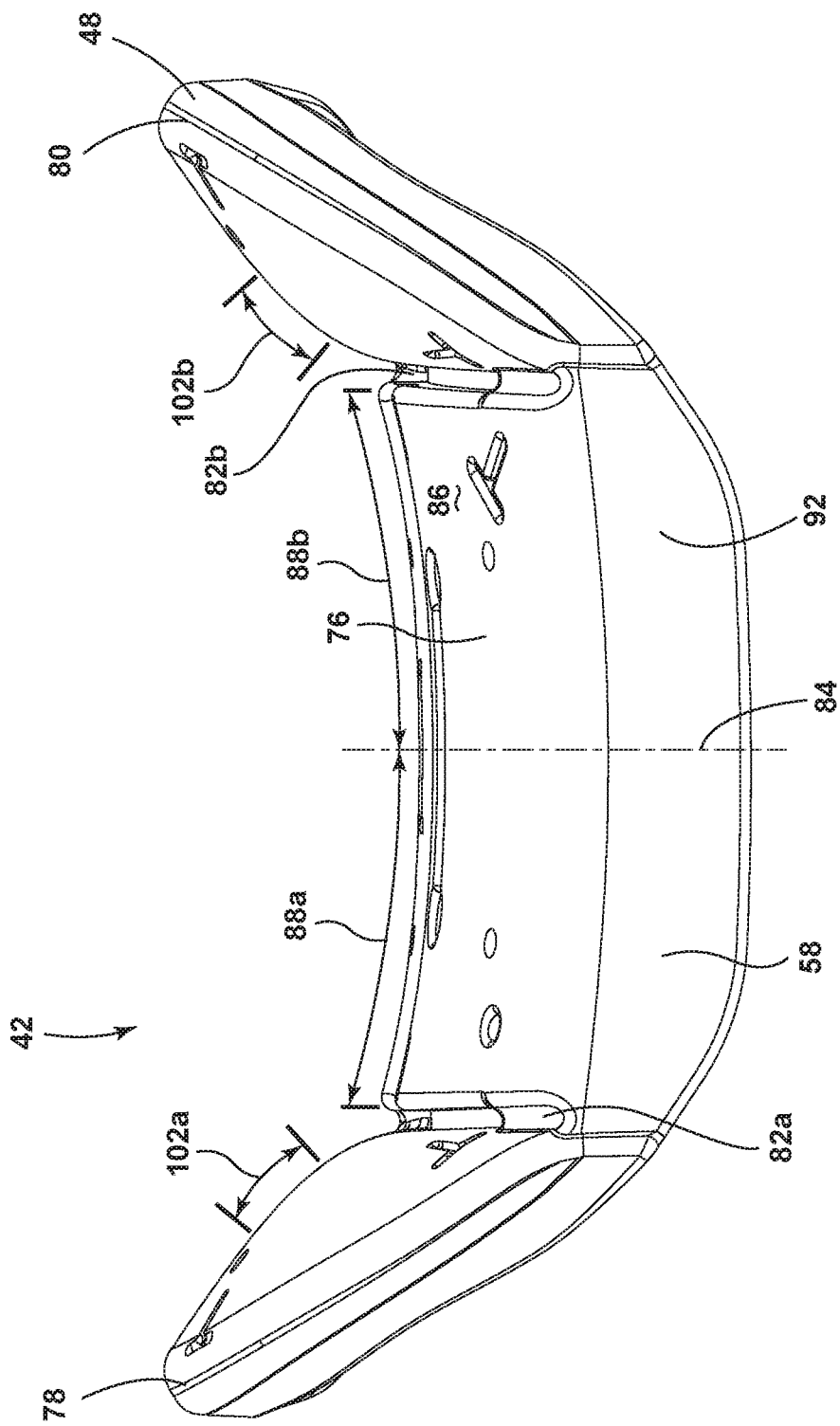
FIG. 9 is a bottom view of the lower lumbar component of FIG. 3, illustrating a forward facing surface of the two opposing laterally and forwardly extending winged sections having a convex line of curvature.
Figure 10:
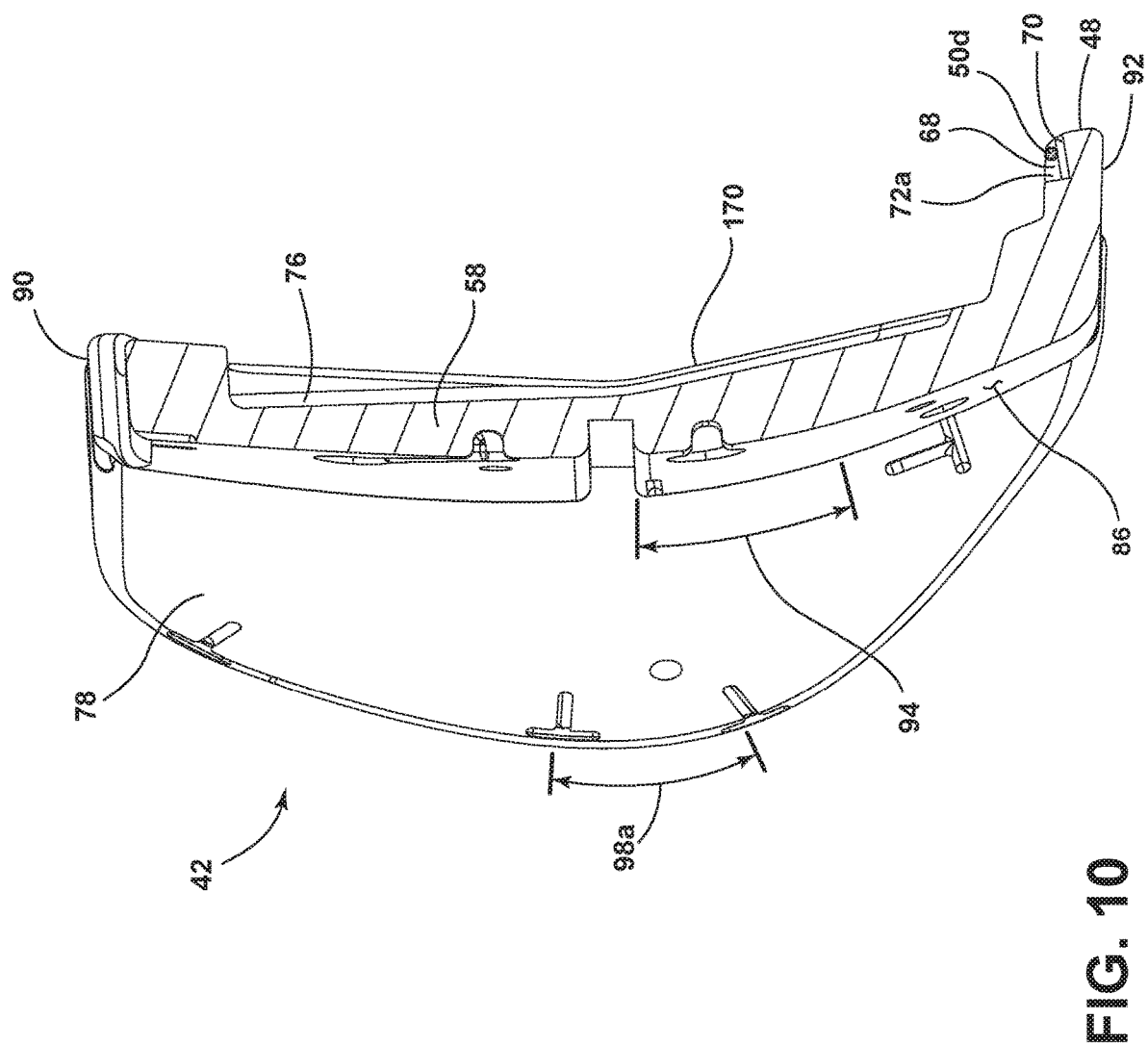
FIG. 10 is a cross-sectional view of the lower lumbar component of FIG. 3 taken through line X-X of FIG. 3, illustrating the forward facing surface of the middle portion having a convex line of curvature.

The outer edge 48 located at both first laterally and forwardly winged portion 78 and the second laterally and forwardly winged portion 80 includes at least one convex line of curvature 98a, 98b (see FIG. 8). In other words, the outer edge 48 between the top 90 and bottom 92 of the middle portion 76 is generally convex. The forward facing surface 86 at both the first laterally and forwardly winged portion 78 and the second laterally and forwardly winged portion 80 includes at least one convex line of curvature 102a, 102b (see FIG. 9). The forward facing surface 86 at both the first laterally and forwardly winged portion 78 and the second laterally and forwardly winged portion 80 is generally convex both horizontally and vertically.

The outer edge 48 at both the first laterally and forwardly winged portion 78 and the second laterally and forwardly winged portion 80 further includes a top portion 104a, 104b (see FIG. 8). The top 90 of the middle portion 76 is recessed relative to the top portion 104a, 104b of the outer edge 48.

Figure 11A:
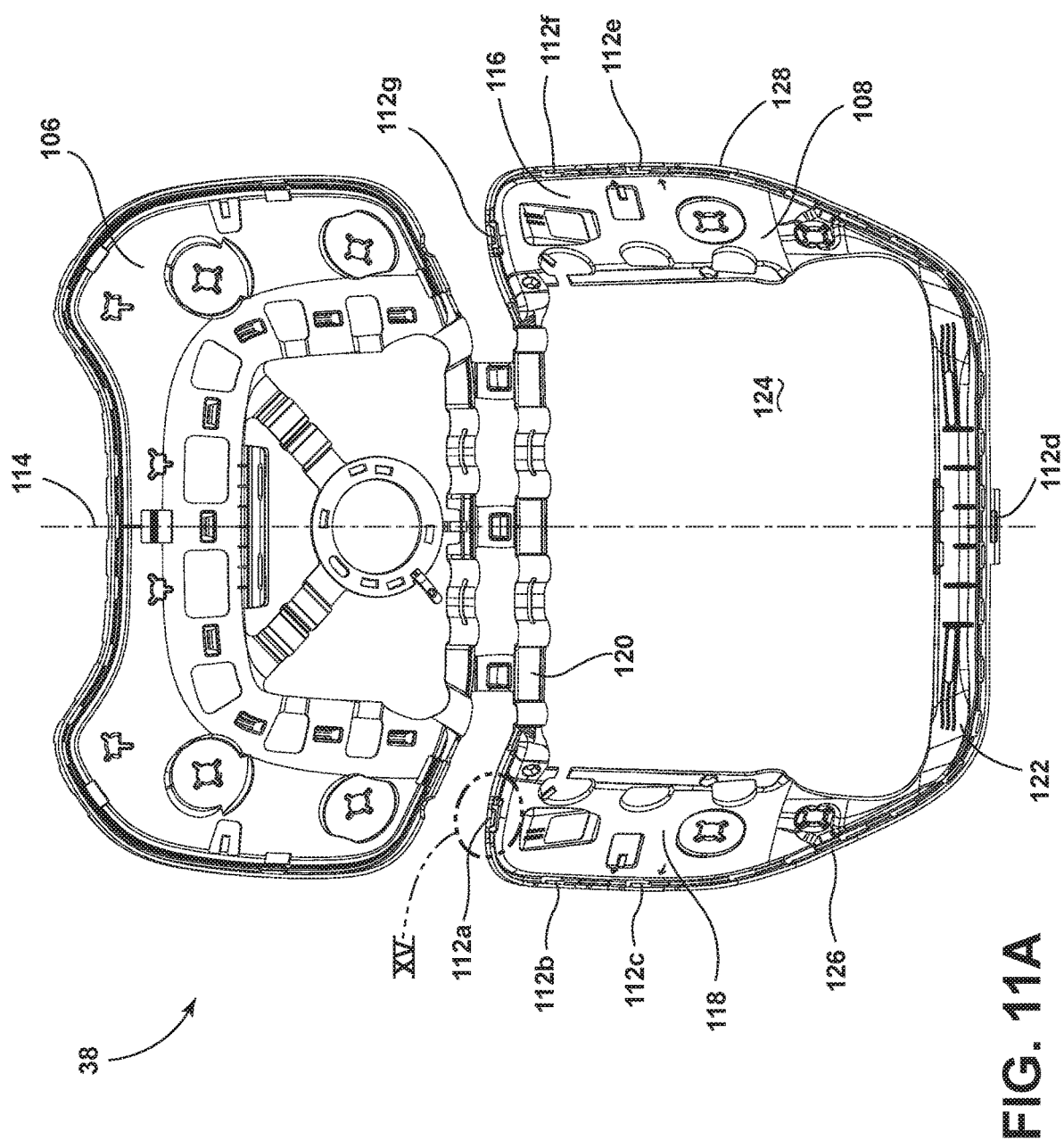
FIG. 11A is a rear view the carrier of FIG. 3, illustrating a plurality of line detents near a perimeter outer surface of the lower lumbar section of the carrier.
Figure 11B:
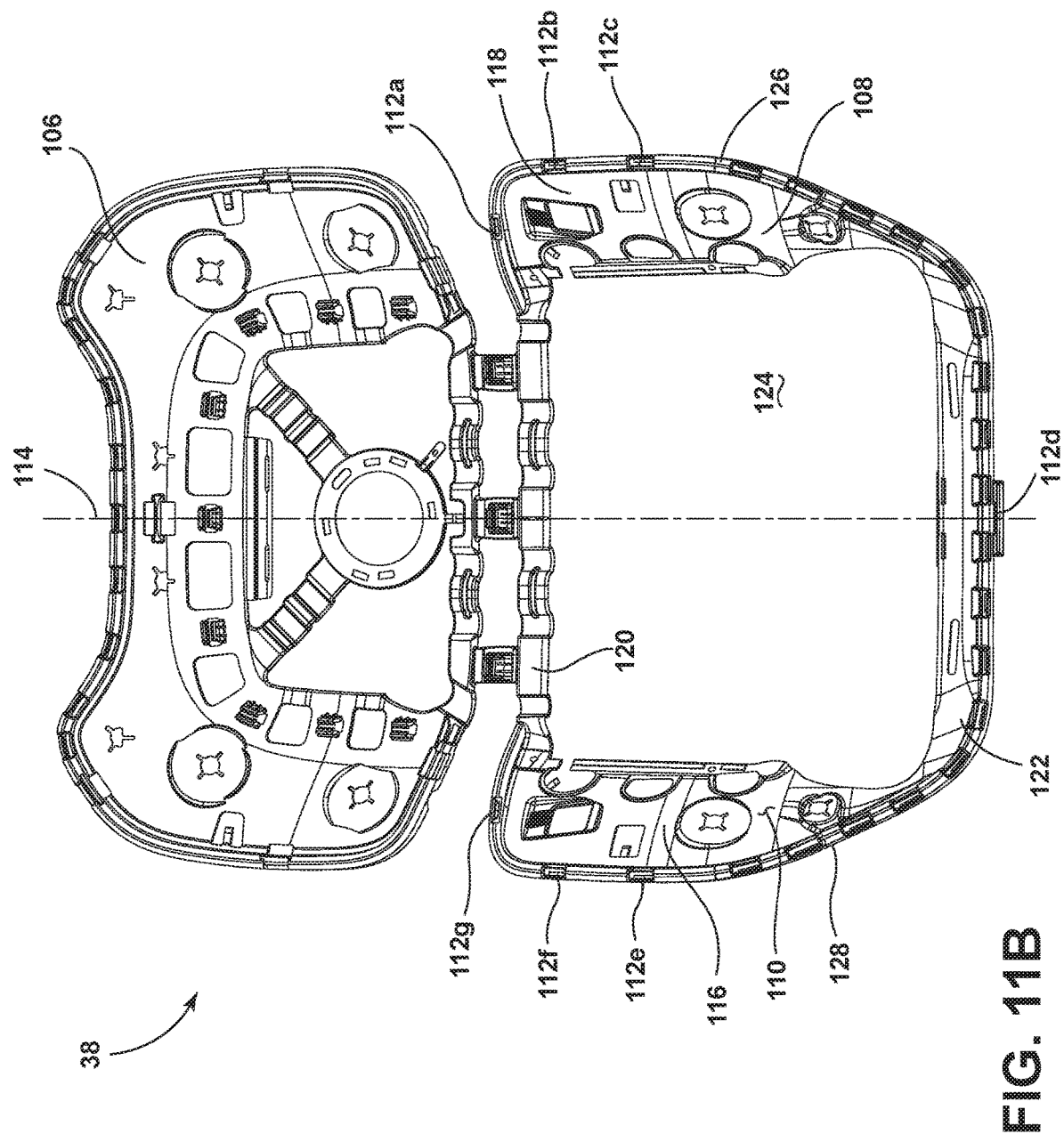
FIG. 11B is a front view of the carrier of FIG. 3, illustrating a cushion facing surface of the lower lumbar section of the carrier.
Figure 12:
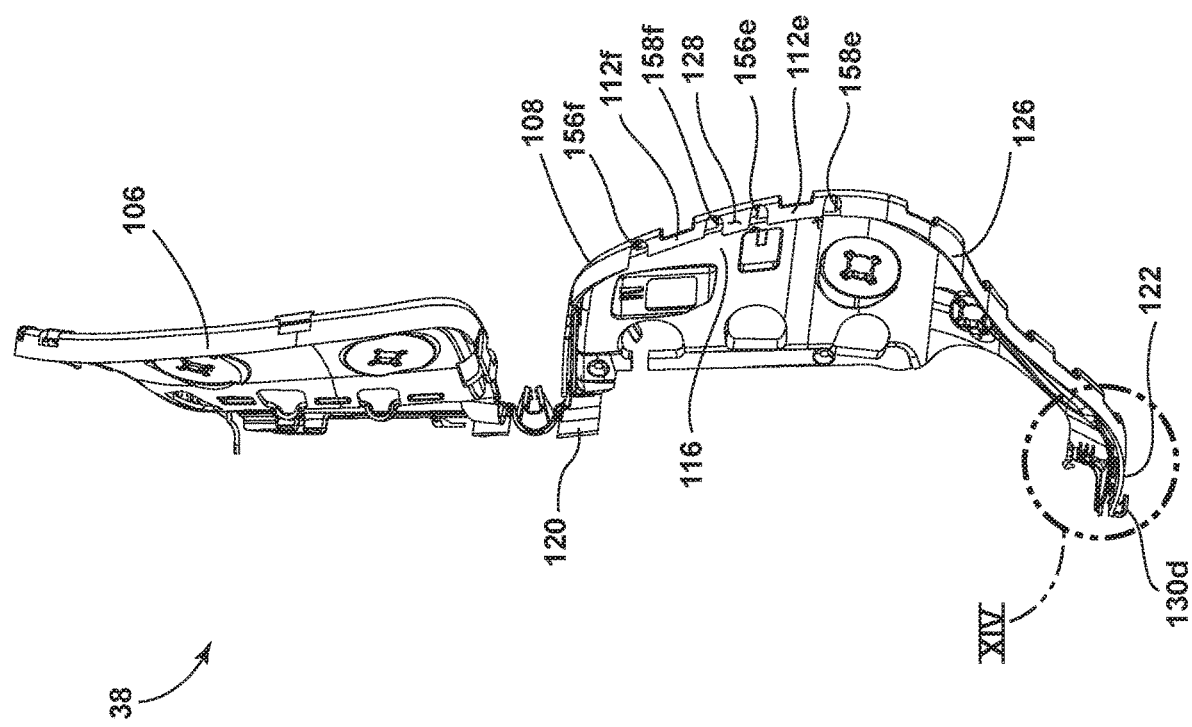
FIG. 12 is a side view of the carrier of FIG. 3, illustrating plurality of line detents near the perimeter outer surface of the lower lumbar section of the carrier.
Figure 13:
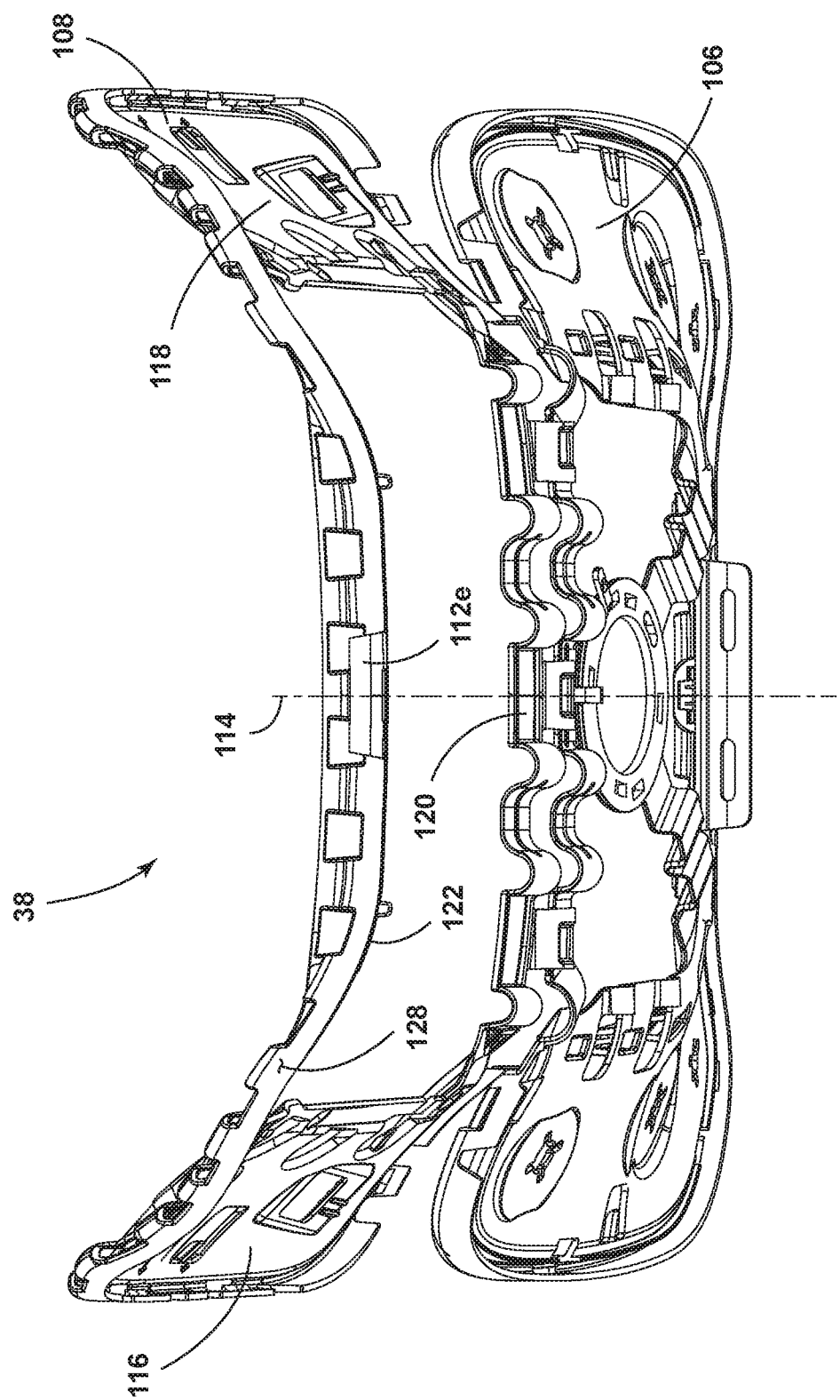
FIG. 13 is a bottom perspective view of the carrier of FIG. 3, illustrating a line detent at the midline of the lower lumbar section of the carrier.

Referring to FIGS. 11-13, the carrier 38 for the seatback comfort assembly 20 includes an upper thoracic section 106 and a lower lumbar section 108. The upper thoracic section 106 of the carrier 38 corresponds to the upper thoracic region 32 of the seatback comfort assembly 20. Likewise, the lower lumbar section 108 of the carrier 38 corresponds to the lower lumbar region 34 of the seatback comfort assembly 20.

The lower lumbar section 108 of the carrier 38 has a perimeter outer surface 128 and a plurality of line detents 112a-g near the perimeter outer surface 128. The plurality of line detents 112a-g include a first line detent 112a, a second line detent 112b, a third line detent 112c, a fourth line detent 112d, a fifth line detent 112e, a sixth line detent 112f, and a seventh line detent 112g. The plurality of line detents 112a-g are arranged to receive the plurality of lines 50a-g on the lower lumbar component 42 of the cushion assembly 36. In other words, the plurality of line detents 112a-g are positioned to interconnect with the plurality of lines 50a-g. For example, first line detent 112a is positioned to interconnect with (i.e., receive and retain) first line 50a, second line detent 112b is positioned to interconnect with (i.e., receive and retain) second line 50b, and so on. Positioning the plurality of line detents 112a-g near the perimeter outer surface 128 helps prevent the lower lumbar component 42 cushion from rolling up when the lower lumbar component 42 is attached to the carrier 38. The carrier 38 has a midline 114.

In this embodiment of the carrier 38, at least one of the plurality of line detents 112a-g, namely line detent 112d, is located at the midline 114. Further, at least three of the plurality of line detents 112a-g, namely line detents 112a-c, are located to one side of the midline 114. Likewise, at least three of the plurality line detents 112a-g, namely line detents 112e-g, are located to the other side of the midline 114. Such an arrangement provides appropriate distribution of the plurality of line detents 112a-g for adequate interconnection between the carrier 38 and the lower lumbar component 42 cushion.

The carrier 38 further includes a cushion facing surface 110. The cushion facing surface 110, at the lower lumbar section 108, faces and abuts the carrier facing surface 170 of lower lumbar component 42.

The lower lumbar section 108 of the carrier 38 further includes a first laterally and forwardly winged portion 116 and a second laterally and forwardly winged portion 118 opposite the first laterally and forwardly winged portion 116. The first laterally and forwardly winged portion 116 supports the first laterally and forwardly winged portion 78 of the lower lumbar component 42. Likewise, the second laterally and forwardly winged portion 118 supports the second laterally and forwardly winged portion 80 of the lower lumbar component 42. An upper wall 120 is between the first laterally and forwardly winged portion 116 and the second laterally and forwardly winged portion 118 at the top of the lower lumbar section 108. The carrier 38 includes a lower cross member 122 opposite the upper wall 120 and between the first laterally and forwardly winged portion 116 and the second laterally and forwardly winged portion 118. The carrier 38 includes a central space 124 surrounded by the first laterally and forwardly winged portion 116, the second laterally and forwardly winged portion 118, the upper wall 120, and the lower cross member 122, and the central space 124 is void. The first laterally and forwardly winged portion 116, the second laterally and forwardly winged portion 118, and the lower cross member 122 each include least one of the plurality of line detents 112a-g. The carrier 38 further includes a rearward extending peripheral lip 126, the outer surface of which is the perimeter outer surface 128.

Figure 14:
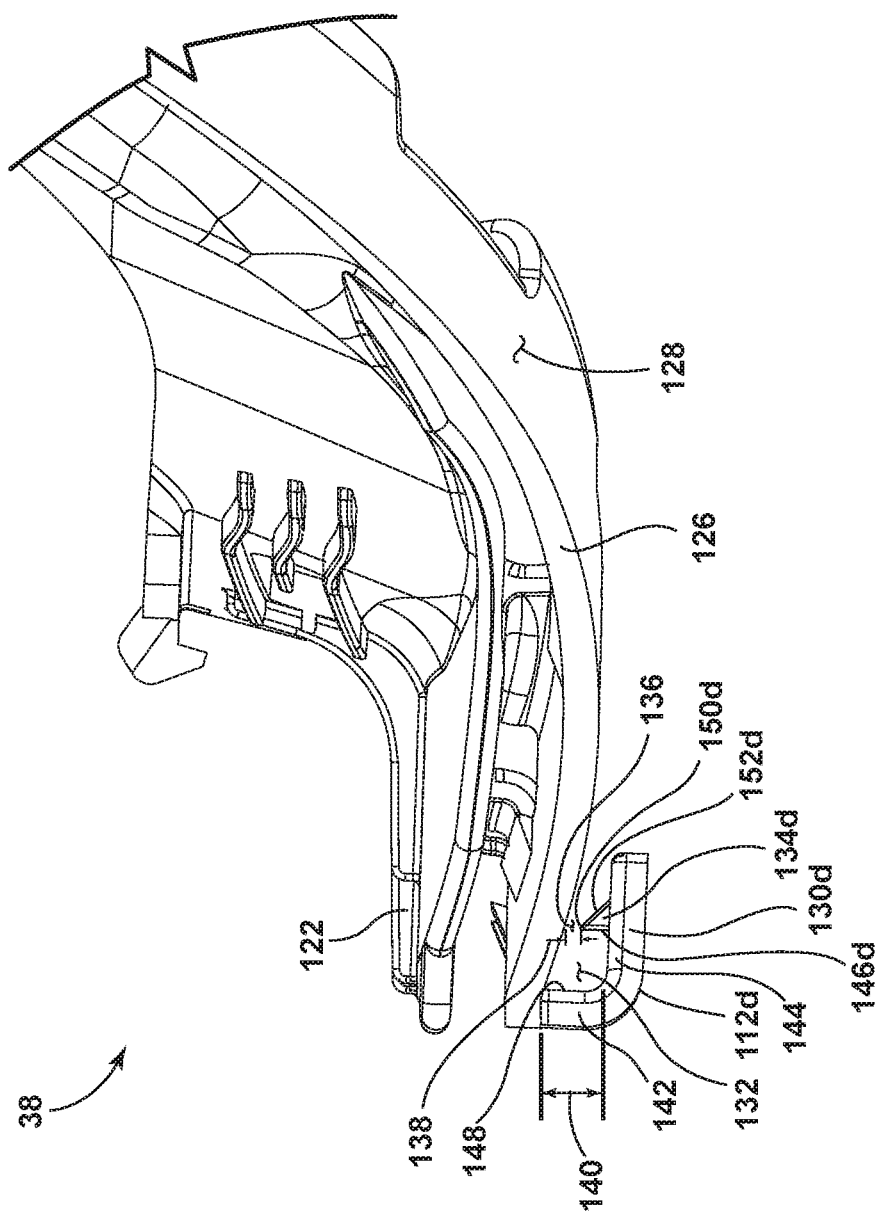
FIG. 14 is a close-up view of the carrier of FIG. 3 taken at area XIV of FIG. 12, illustrating a line detent forming a line retention channel to receive and retain a line.

Referring to FIG. 14, line detent 112d, located at the midline 114 along the lower cross member 122, includes a tab 130d extending from the perimeter outer surface 128 forming a line retention channel 132. The tab 130d extends first generally away from the perimeter outer surface 128 and then rearward. The line retention channel 132 extends laterally from the midline 114. The tab 130d includes a tooth 134d adjacent to the line retention channel 132. The space between the tooth 134d and the perimeter outer surface 128 forms an opening 136 into the line retention channel 132. The opening 136 has a width 138. The opening 136 allows for line 50d of the lower lumbar component 42 to be forced through the opening 136 and into the line retention channel 132, and the tooth 134d prevents line 50d from exiting the line retention channel 132.

More specifically, the tab 130d includes a transversely extending portion 142 that extends away (that is, down) from the perimeter outer surface 128, and an opposing section 144 that faces the perimeter outer surface 128. The opposing section 144 extends from the transversely extending portion 142 in a generally forward direction. The tooth 134d extends from the opposing section 144 toward the perimeter outer surface 128. In other words, the tooth 134d extends from the opposing section 144 in a generally upward direction. The perimeter outer surface 128, the transversely extending portion 142, the opposing section 144, and the tooth 134d form the line retention channel 132. The distance between the opposing section 144 and the perimeter outer surface 128 defines a width 140 of the line retention channel 132. The width 138 of the opening 136 is narrower than the width 140 of the line retention channel 132, which helps retain line 50d when received in the line retention channel 132. The tooth 134d includes a retaining surface 146d that faces and forms part of the line retention channel 132. The transversely extending portion 142 includes an inward facing surface 148 that faces and forms part of the line retention channel 132. The inward facing surface 148 defines a plane. The retaining surface 146d of the tooth 134d faces that plane. The tooth 134d includes an apex 150d, which points toward the perimeter outer surface 128. The opening 136 into the line retention channel 132 is the gap between the apex 150d and the perimeter outer surface 128. The tooth 134d further comprises a slide surface 152d that is angled from the opposing section 144 toward the apex 150d. In other words, the gap between the slide surface 152d and the perimeter outer surface 128 narrows toward the apex 150d. This allows line 50d to slide over the slide surface 152d of the tooth 134d, over the apex 150d, and into the line retention channel 132. That is an aid to inserting line 50d into the line retention channel 132 of a line detent 112d. In other embodiments of the carrier 38, all of the plurality of line detents 112a-g could have the structure and features herein described for line detent 112d.

Figure 15:
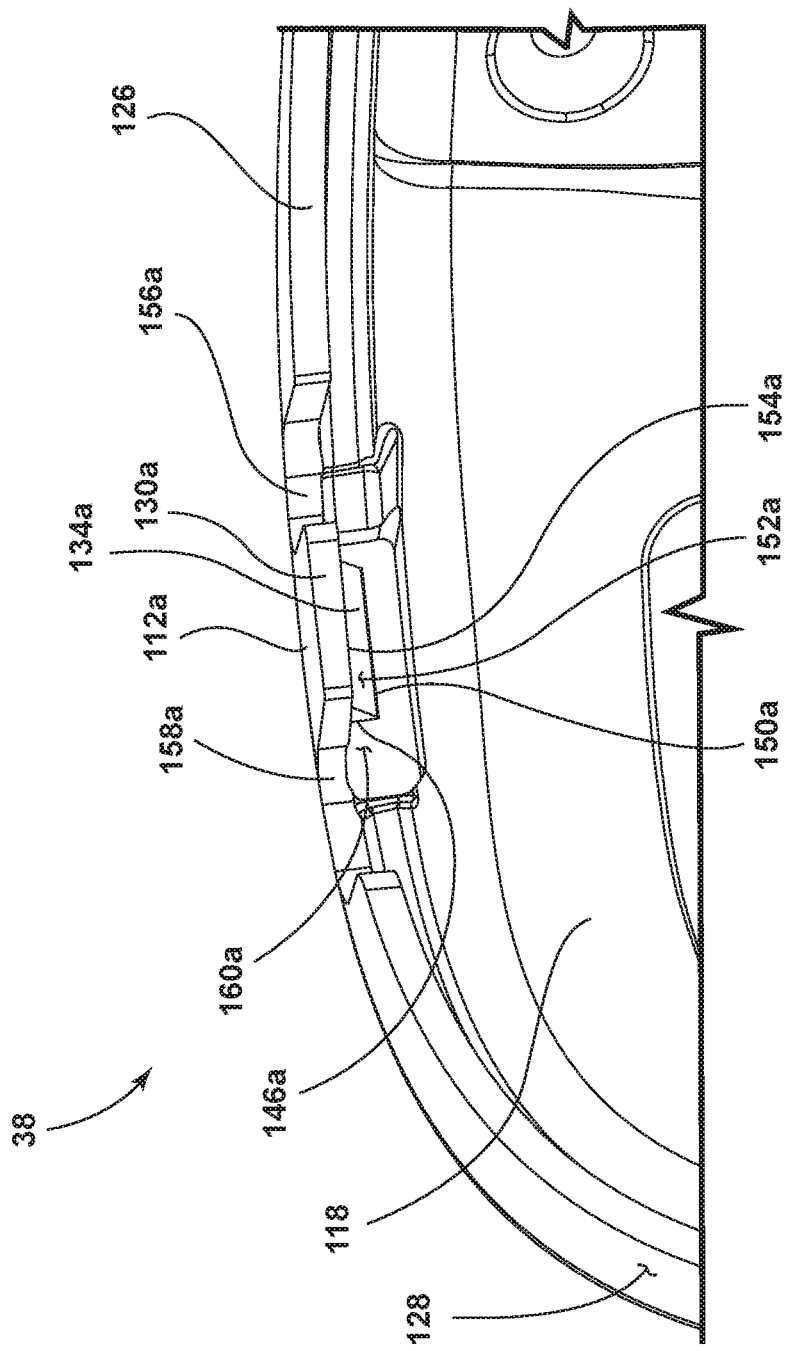
FIG. 15 is a close-up view of the carrier of FIG. 3 taken at XV of FIG. 11A, illustrating a line detent to receive and retain a line.

Referring to FIG. 15, detent 112a, is illustrated, and is representative of line detents 112a-c, e-g. Line detent 112a includes a rearward extending tab 130a formed in (i.e., is contiguous with) the rearward extending peripheral lip 126. The outermost surface of the line detent 112a is the perimeter outer surface 128. The tab 130a has an inside surface 154a. A tooth 134a extends inward from the inside surface 154a. The peripheral lip 126 includes a first recess 156a adjacent the tab 130a and a second recess 158a adjacent the tab 130a on the opposite side of the tab 130a as the first recess 156a. The tooth 134a includes an apex 150a. The tooth 134a further includes a slide surface 152a and a retaining surface 146a on the other side of the tooth 134a as the slide surface 152a. The retaining surface 146a and the slide surface 152a coincide at the apex 150a. The slide surface 152a and the inside surface 154a of the tab 130a form an obtuse angle toward the apex 150a. This helps line 50a slide over the apex 150a of the tooth 134a into a line retention area 160a. The retaining surface 146a retains line 50a in place when the lower lumbar component 42 interconnects with the lower lumbar section 108 of the carrier 38.

Figure 16:
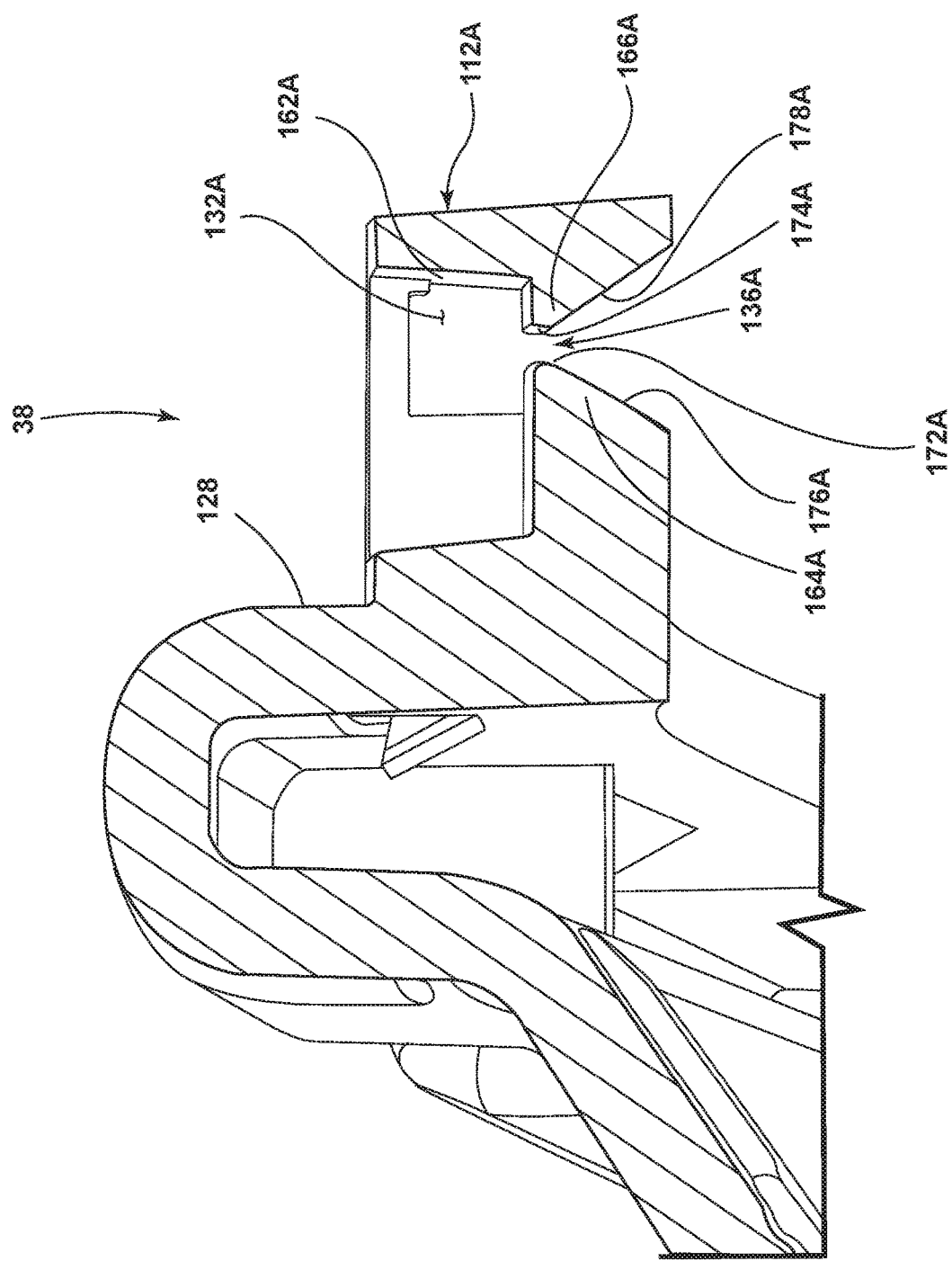
FIG. 16 is a cross-sectional view of an alternative embodiment of a line detent for use on the carrier of FIG. 3, illustrating a near tooth and an opposing far tooth defining an opening into a line retention channel.
Figure 17:
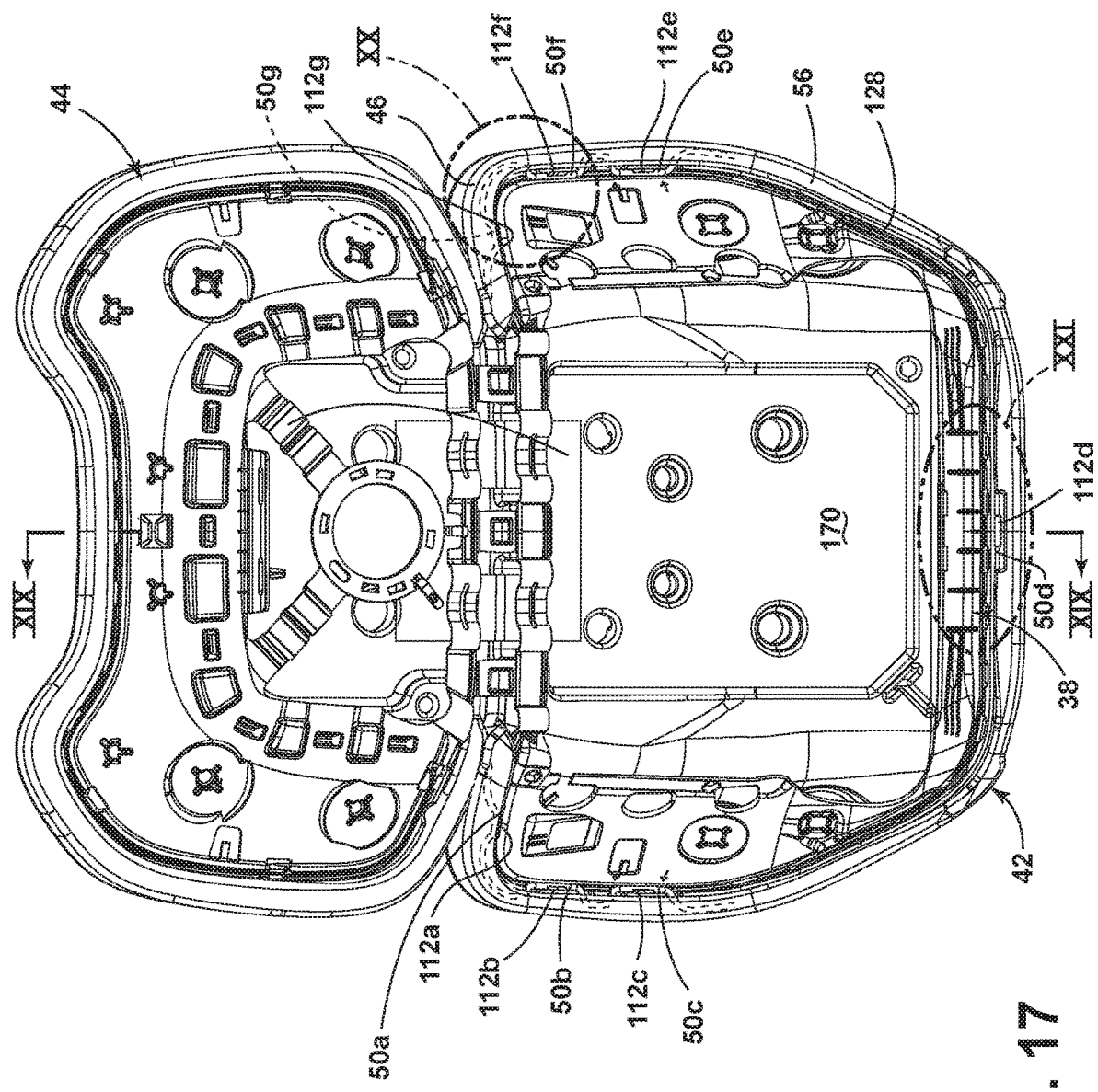
FIG. 17 is a rear view of the carrier of FIG. 3 interconnected with the lower lumbar component of FIG. 3, illustrating the plurality of line detents of the carrier having received and retained the plurality of lines of the lower lumbar component.
Figure 18:
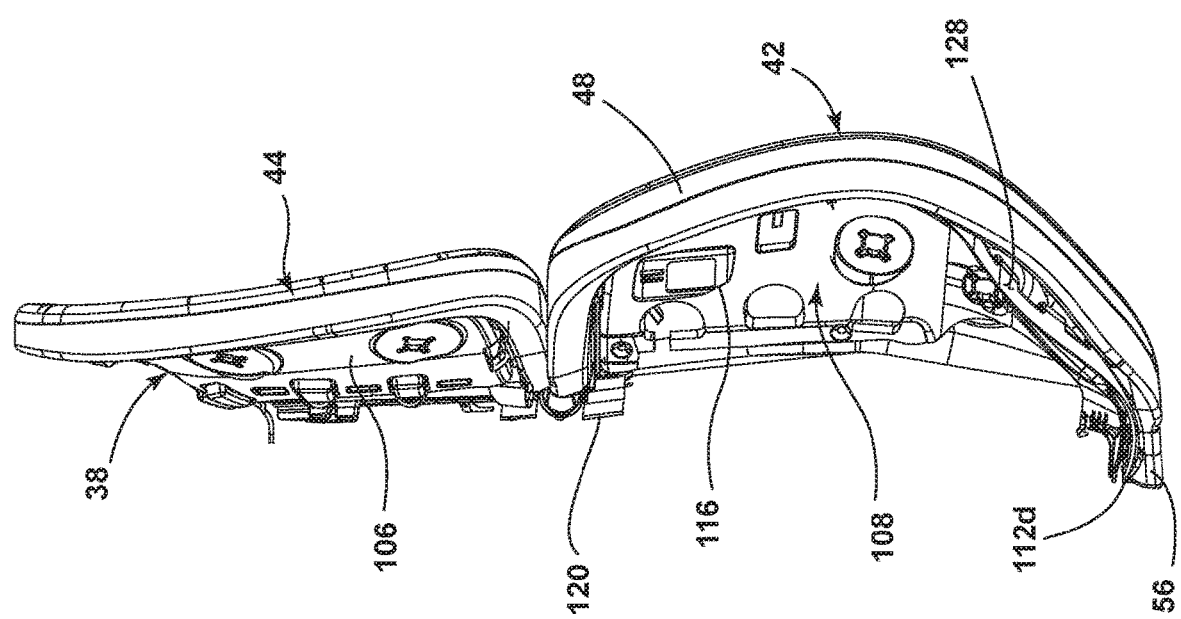
FIG. 18 is a side view of the carrier of FIG. 3 interconnected with the lower lumbar component of FIG. 3.
Figure 19:
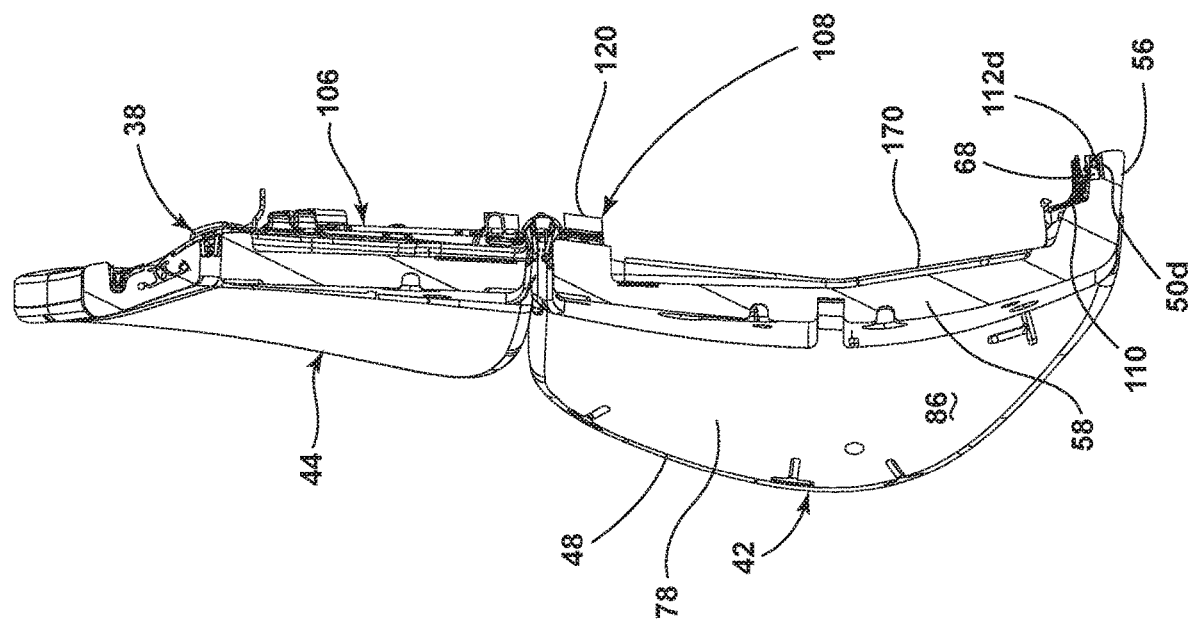
FIG. 19 is a cross-sectional view of the carrier of FIG. 3 interconnected with the lower lumbar component of FIG. 3 taken through line XIX-XIX of FIG. 17.
Figure 20:
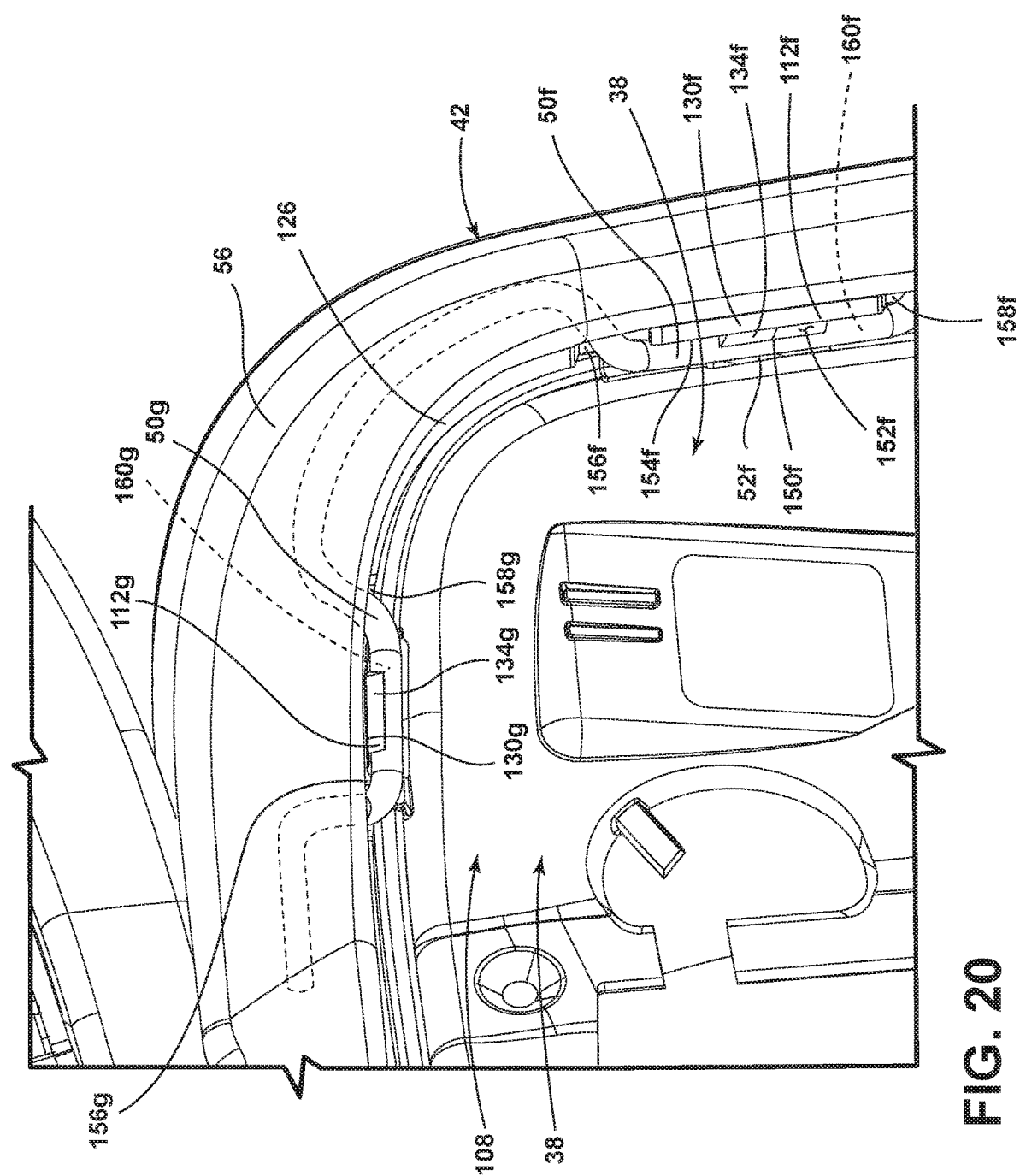
FIG. 20 is a close-up view of the carrier of FIG. 3 interconnected with the lower lumbar component of FIG. 3, taken at area XX of FIG. 17, illustrating several line detents having received and retained several lines.
Figure 21:
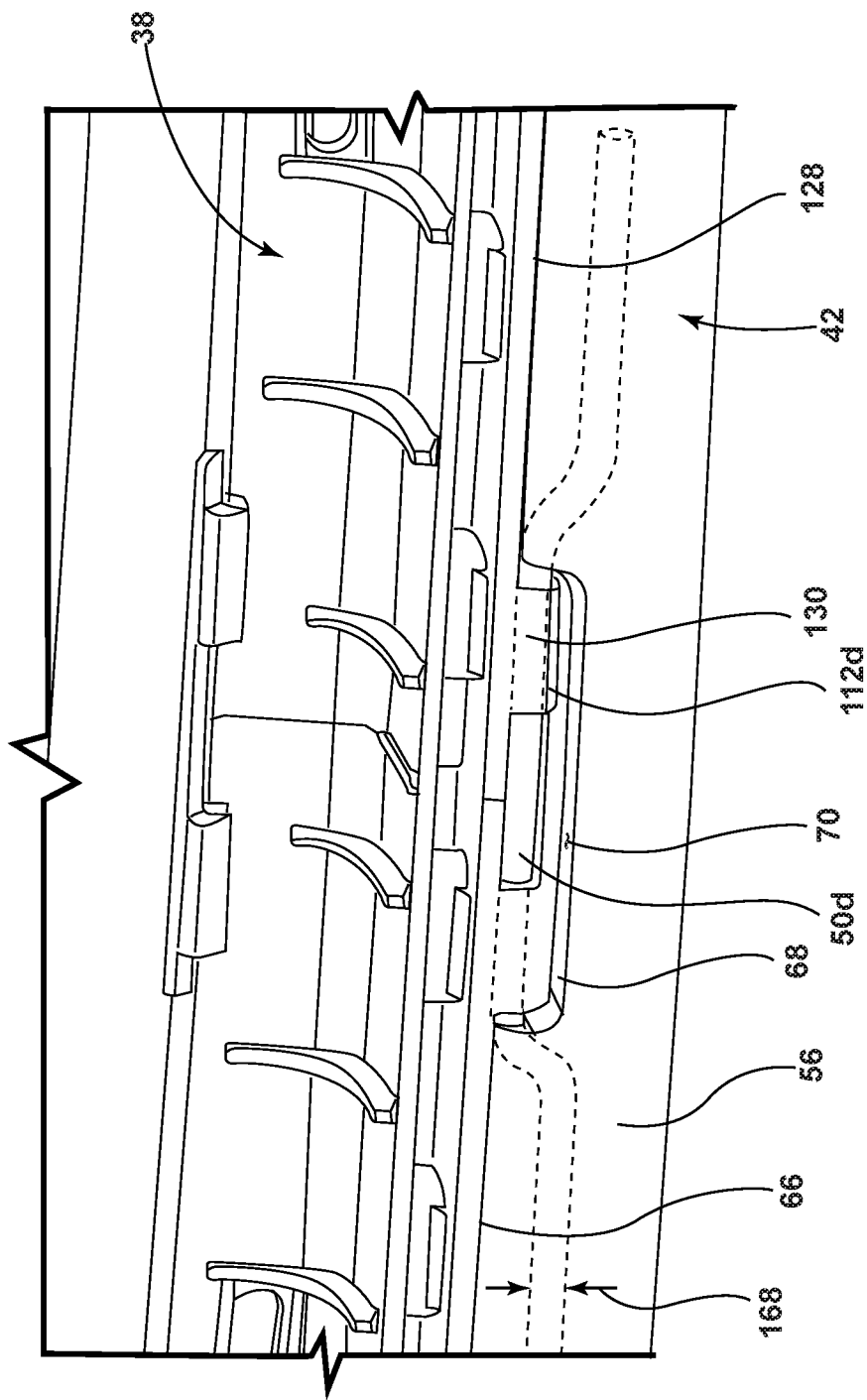
FIG. 21 is a close-up view of the carrier of FIG. 3 interconnected with the lower lumbar component of FIG. 3, taken at area XXI of FIG. 17, illustrating a line detent having received and retained a line.

Referring now to FIG. 16, an alternative embodiment of a line detent, detent 112A, that could be used with carrier 38 is illustrated. Detent 112A projects outward from the perimeter outer surface 128 of the carrier 38. The detent 112A includes an elongated partial enclosure 162A defining a line retention channel 132A parallel to the perimeter outer surface 128. The line detent 112A further includes an opening 136A into the elongated partial enclosure 162A for one of the plurality of lines 50a-g to be inserted into the line retention channel 132A. The detent 112A further includes a near tooth 164A adjacent the opening 136A and a far tooth 166A opposite the near tooth 164A and adjacent the opening 136A. The near tooth 164A and the far tooth 166A both include an apex 172A and 174A respectively and an angled slide surface 176A and 178A, such that the width of the opening 136A to the line retention channel 132A decreases toward the respective apex 172A and apex 174A. The opening 136A is rearward of the line retention channel 132A. In other words, the opening 136A into the line retention channel 132A is accessible from the rear of the carrier 38. The angled slide surface 176A and 178A assist one of the plurality of lines 50a-g entering the line retention channel 132A through the opening 136A. The near tooth 164A and the opposing far tooth 166A help retain the line of the plurality of lines 50a-g that entered into the line retention channel 132A.

Referring to FIGS. 17-21, the lower lumbar component 42 of the cushion assembly 36 becomes interconnected with the lower lumbar section 108 of the carrier 38 by placing the carrier facing surface 170 of the lower lumbar component 42 onto the cushion facing surface 110 of the lower lumbar section 108 of the carrier 38. Line 50f of the plurality of lines 50a-g is placed within line detent 112f (see FIG. 20) of the plurality of line detents 112a-g such that line detent 112f receives and now retains line 50f More specifically, the parallel portion 52f of line 50f is slid over slide surface 152f of the tooth 134f, over the apex 150f, and into the line retention area 160f. The result is that line 50f extends through the first recess 156f of the peripheral lip 126 of the carrier 38, adjacent the retaining surface 146a of the tooth 134f, adjacent the inside surface 154f of the tab 130f, and through the second recess 158f. Lines 50a-c, e, and g are placed within line detents 112a-c, e, and g, respectively, in the same manner and with the same result. Line 50d of the plurality of lines 50a-g is placed within line detent 112d (see FIG. 21) such that line detent 112d receives and now retains line 50d. More specifically, line 50d is slid over slide surface 152d of tooth 134d, over the apex 150d, through the opening 136, and into the line retention channel 132. The opposing section 144 of the tab 130d is now between the line 50d and the elongated surface 70 of the recessed portion 68 of the lip 56. The width 138 of the opening 136 into the line retention channel 132 can be smaller than the width 168 of the line. That helps retain line 50d in the line retention channel 132. The plurality of lines 50a-g can provide audible and tactile feedback that they have been received and retained by the plurality of line detents 112a-g, through a snapping sound.

Accordingly, the plurality of line detents 112a-g have received, are retaining, and are interconnected with the plurality of lines 50a-g. Thus, the lower lumbar component 42 of the cushion assembly 36 is interconnected with the lower lumbar section 108 of the carrier 38. The carrier facing surface 170 of the lower lumbar component 42 thus faces and abuts the cushion facing surface 110 of the lower lumbar section 108 of the carrier 38. The plurality of line detents 112a-g are interconnected with the plurality of lines 50a-g. More specifically, the first line detent 112a has received and is retaining the first line 50a, the second line detent 112b has received and is retaining the second line 50b, the third line detent 112c has received and is retaining the third line 50c, the fourth line detent 112d has received and is retaining the fourth line 50d, the fifth line detent 112e has received and is retaining the fifth line 50e, the sixth line detent 112f has received and is retaining the sixth line 50f, and the seventh line detent 112g has received and is retaining the seventh line 50g. As the plurality of line detents 112a-g are arranged close to the perimeter outer surface 128 and spaced apart, and there are plurality of lines 50a-g arranged close to the outer edge 48 to accommodate the location of the plurality of line detents 112a-g, the outer edge 48 of the lower lumbar component 42 cushion is prevented from rolling up.

The lower lumbar component 42 cushion at least partially surrounds carrier 38 with at least a portion of the inwardly facing surface 66 of the lip 56 facing the perimeter outer surface 128 of the lower lumbar section 108 of the carrier 38. By partially encircling the lower lumbar section 108 of the carrier 38 in this manner, the lower lumbar component 42 is more apt to stay on and interconnected with the carrier 38. By interconnecting the plurality of lines 50a-g and the plurality of line detents 112a-g adjacent, that is, close to, the lip 56, the outer edge 46 of the lower lumbar component 42 is less likely to roll up.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cushion for a seating assembly of a vehicle comprising:
   an outer edge;
   a lip along the outer edge configured to partially surround a structural support, the lip comprising an inwardly facing surface; and
   a plurality of lines that project inward from the inwardly facing surface of the lip, the plurality of lines arranged to interconnect with a plurality of detents on the structural support.

2. The cushion of claim 1 further comprising:
   a first surface and a carrier facing surface that faces a generally opposite direction as the first surface;
   wherein the plurality of lines are accessible for interconnection from the carrier facing surface.

3. The cushion of claim 1, each of the plurality of lines comprising a parallel portion that is parallel to the outer edge.

4. The cushion of claim 1,
   the lip further comprising a recessed portion recessed into the inwardly facing surface; and
   one of the plurality of lines is disposed within the recessed portion and extends generally parallel to the inwardly facing surface.

5. The cushion of claim 2,
   the first surface is a forward facing surface, and the lip extends generally rearward.

6. The cushion of claim 1, the lip further comprising an inward edge adjacent the inwardly facing surface;
   wherein at least a portion of the plurality of lines project from the inwardly facing surface at an angle away from the inward edge.

7. The cushion of claim 1 further comprising:
   a foam portion; and
   a contiguous wire molded into the foam portion;
   wherein the contiguous wire comprises an exposed portion forming at least one of the plurality of lines and embedded portions embedded into the foam portion before and after the at least one of the plurality of lines.

8. A carrier for a seating assembly of a vehicle comprising:
   a cushion facing surface;
   a peripheral lip that extends generally away from a general direction that the cushion facing surface faces, the peripheral lip defining a perimeter outer surface of the carrier; and
   a plurality of line detents disposed at the peripheral lip arranged to receive and retain a plurality of lines positioned on a cushion and thereby interconnect the carrier and the cushion.

9. The carrier of claim 8,
   at least one line detent of the plurality of line detents comprises a tab formed in the peripheral lip, the tab comprising an outer surface; and
   the perimeter outer surface of the carrier defines the outer surface of the tab.

10. The carrier of claim 9, the tab further comprising an inside surface and a tooth extending inward from the inside surface.

11. The carrier of claim 10, the tooth comprising a slide surface and a retaining surface;
    wherein the slide surface and the retaining surface coincide at an apex; and
    wherein the slide surface and the inside surface of the tab form an obtuse angle toward the apex.

12. The carrier of claim 10,
    wherein the peripheral lip further comprises a first recess and a second recess that together define the tab.

13. The carrier of claim 8,
    at least one line detent of the plurality of line detents comprises a tab, the tab comprising a transversely extending portion that extends away from the perimeter outer surface and an opposing section that faces the perimeter outer surface; and
    the perimeter outer surface, the transversely extending portion, and the opposing section forming a line retention channel.

14. The carrier of claim 13, the tab further comprising:
    a tooth extending toward the perimeter outer surface;
    wherein the tooth and the perimeter outer surface define an opening into the line retention channel;
    wherein the distance between the opposing section and the perimeter outer surface defines a width of the line retention channel and the opening has a width; and
    wherein the width of the opening is narrower than the width of the line retention channel.

15. A seating assembly for a vehicle comprising:
    a carrier comprising:
      a cushion facing surface;
      a peripheral lip that extends generally away from a general direction that the cushion facing surface faces, the peripheral lip defining a perimeter outer surface of the carrier; and
      a plurality of line detents disposed at the peripheral lip; and
    a cushion disposed over the carrier, the cushion comprising:
      an outer edge;
      a lip along the outer edge at least partially surrounding the carrier, the lip comprising an inwardly facing surface that faces the perimeter outer surface of the carrier; and
      a plurality of lines that project inward from the inwardly facing surface of the lip, each of the plurality of lines cooperating with the one of the plurality of line detents of the carrier to maintain the cushion over the carrier.

16. The seating assembly of claim 15, at least one of the plurality of line detents of the carrier further comprises a tab, the tab comprising a transversely extending portion that extends away from the perimeter outer surface and an opposing section that faces the perimeter outer surface;

the perimeter outer surface, the transversely extending portion, and the opposing section form a line retention channel;

the lip of the cushion further comprises a recessed portion recessed into the inwardly facing surface, and the at least one of the plurality of lines is disposed within the recessed portion and extends generally parallel to the inwardly facing surface;

the at least one of the plurality of lines of the cushion is disposed in the line retention channel of the at least one line detent of the carrier; and the opposing section of the at least one line detent of the carrier is disposed between the at least one of the plurality of lines of the cushion and the lip of the cushion.

17. The seating assembly of claim 15, at least one of the plurality of lines comprises a parallel portion that is parallel to the outer edge; and at least one of the plurality of line detents comprises a tab formed in the peripheral lip of the carrier, the tab comprising an outer surface defined by the perimeter outer surface of the carrier, an inside surface, and a tooth extending inward from the inside surface;

wherein the at least one of the plurality of lines is adjacent the inside surface and the tooth, with the tab disposed between the at least one of the plurality of lines and inwardly facing surface of the lip of the cushion.

18. The seating assembly of claim 15, the cushion further comprises: (i) a carrier facing surface that faces the cushion facing surface of the carrier; and (ii) a forward facing surface that faces generally forward; and the lip of the cushion extends generally rearward.

19. The seating assembly of claim 17, the peripheral lip of the carrier further comprises a first recess and a second recess defining the tab; and the at least one of the plurality of lines extends through the first recess and the second recess.

20. The seating assembly of claim 19, the cushion further comprising a foam portion and one or more contiguous wires molded into the foam portion, wherein the one or more contiguous wires each comprise at least one exposed portion forming at least one of the plurality of lines and embedded portions embedded into the foam portion before and after the at least one exposed portion.

* * * * *